(12) United States Patent
Maheshwari et al.

(10) Patent No.: US 11,551,547 B2
(45) Date of Patent: Jan. 10, 2023

(54) LANE DETECTION AND TRACKING TECHNIQUES FOR IMAGING SYSTEMS

(71) Applicant: LUMINAR, LLC, Orlando, FL (US)

(72) Inventors: Pranav Maheshwari, Palo Alto, CA (US); Vahid R. Ramezani, Los Altos, CA (US); Ismail El Houcheimi, Orlando, FL (US); Shubham C. Khilari, Palo Alto, CA (US); Rounak Mehta, Orlando, FL (US)

(73) Assignee: Luminar, LLC, Orlando, FL (US)

( * ) Notice: Subject to any disclaimer, the term of this patent is extended or adjusted under 35 U.S.C. 154(b) by 336 days.

(21) Appl. No.: 16/925,190

(22) Filed: Jul. 9, 2020

(65) Prior Publication Data

US 2021/0206380 A1  Jul. 8, 2021

Related U.S. Application Data

(60) Provisional application No. 62/957,650, filed on Jan. 6, 2020.

(51) Int. Cl.
*B60W 40/072* (2012.01)
*G08G 1/04* (2006.01)
(Continued)

(52) U.S. Cl.
CPC .............. *G08G 1/04* (2013.01); *B60W 40/072* (2013.01); *G05D 1/0234* (2013.01); *G06N 20/00* (2019.01);
(Continued)

(58) Field of Classification Search
CPC ........ G08G 1/04; G08G 1/0112; G08G 1/167; B60W 40/072; B60W 60/0016;
(Continued)

(56) References Cited

U.S. PATENT DOCUMENTS 8,300,052 B1 * 10/2012 Hetu ................... G06T 19/20
345/441
9,423,261 B2 * 8/2016 Dorum .................. G01C 21/32
(Continued)

FOREIGN PATENT DOCUMENTS

CN  102772705  10/2012
CN  108216229   6/2018
(Continued)

OTHER PUBLICATIONS

Translated Version of KR101455835 (Year: 2014).*
(Continued)

*Primary Examiner* — Carol Wang

(57) ABSTRACT

A method for tracking a lane on a road is presented. The method comprises receiving, by one or more processors from an imaging system, a set of pixels associated with lane markings. The method further includes generating, by the one or more processors, a predicted spline comprising (i) a first spline and (ii) a predicted extension of the first spline in a direction in which the imaging system is moving. The first spline describes a boundary of a lane and is generated based on the set of pixels. The predicted extension of the first spline is generated based at least in part on a curvature of at least a portion of the first spline.

20 Claims, 19 Drawing Sheets

(51) Int. Cl.
| | |
|---|---|
| *G05D 1/02* | (2020.01) |
| *G06N 20/00* | (2019.01) |
| *G06T 7/11* | (2017.01) |
| *G06T 11/20* | (2006.01) |
| *G06V 10/426* | (2022.01) |
| *G06V 10/50* | (2022.01) |
| *G06V 20/56* | (2022.01) |
| *G08G 1/01* | (2006.01) |
| *B60W 60/00* | (2020.01) |
| *G05D 1/00* | (2006.01) |

(52) U.S. Cl.
CPC ............... *G06T 7/11* (2017.01); *G06T 11/20* (2013.01); *G06V 10/426* (2022.01); *G06V 10/50* (2022.01); *G06V 20/588* (2022.01); *G08G 1/0112* (2013.01); *B60W 60/0016* (2020.02); *B60W 60/0025* (2020.02); *B60W 2420/42* (2013.01); *B60W 2420/52* (2013.01); *B60W 2552/00* (2020.02); *G05D 1/0088* (2013.01); *G05D 2201/0213* (2013.01); *G06T 2207/30256* (2013.01); *G06T 2210/12* (2013.01)

(58) Field of Classification Search
CPC ......... B60W 60/0025; B60W 2420/42; B60W 2420/52; B60W 2552/00; G05D 1/0234; G05D 1/0088; G05D 2201/0213; G06N 20/00; G06N 20/10; G06N 5/022; G06T 7/11; G06T 11/20; G06T 2207/30256; G06T 2210/12; G06V 10/426; G06V 10/50; G06V 10/765; G06V 10/7715; G06V 20/588

See application file for complete search history.

(56) References Cited

U.S. PATENT DOCUMENTS

| | | | |
|---|---|---|---|
| 10,229,346 | B1 | 3/2019 | Kim et al. |
| 2011/0032357 | A1 | 2/2011 | Kitaura et al. |
| 2014/0095062 | A1 | 4/2014 | Wang et al. |
| 2016/0180177 | A1* | 6/2016 | Nguyen ............... G06V 10/764 382/104 |
| 2018/0060677 | A1 | 3/2018 | Bai et al. |
| 2018/0276884 | A1 | 9/2018 | Feng et al. |
| 2020/0160547 | A1 | 5/2020 | Liu et al. |
| 2020/0385018 | A1 | 12/2020 | Kameoka et al. |
| 2021/0097336 | A1 | 4/2021 | Schafer |

FOREIGN PATENT DOCUMENTS

| | | | |
|---|---|---|---|
| KR | 10-2011-0114905 | | 10/2011 |
| KR | 101455835 | B1 * | 11/2014 |
| WO | WO-2018200522 | A1 * | 11/2018 .......... B60W 40/072 |
| WO | 2019/168869 | | 9/2019 |
| WO | WO-2019195415 | A1 * | 10/2019 ............ B60W 30/08 |

OTHER PUBLICATIONS

International Search Report and Written Opinion for PCT/US2021/012288 dated Oct. 19, 2021.

Non-Final Office Action dated Nov. 1, 2022 for U.S. Appl. No. 16/924,139.

* cited by examiner

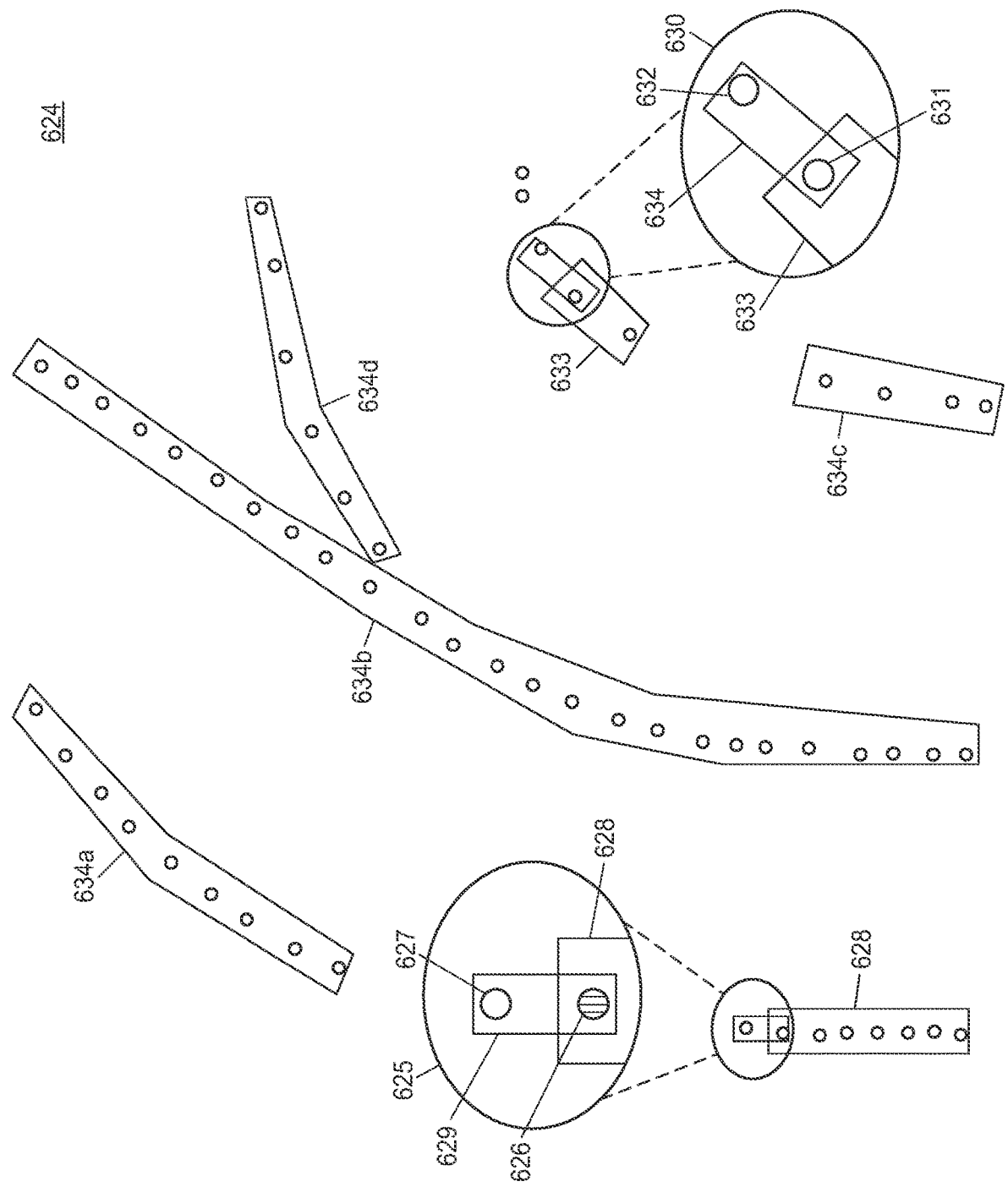

US 11,551,547 B2

LANE DETECTION AND TRACKING TECHNIQUES FOR IMAGING SYSTEMS

CROSS-REFERENCE TO RELATED APPLICATION

This application claims priority to U.S. Provisional Application Ser. No. 62/957,650, which was filed on Jan. 6, 2020, and is titled "Lane Detection and Tracking Techniques for Imaging Systems," the entirety of which is expressly incorporated herein by reference.

FIELD OF THE DISCLOSURE

The present disclosure generally relates to object detection capabilities of autonomous vehicle systems and, more particularly, to accurately detecting and predicting lane boundary locations during autonomous vehicle operation.

BACKGROUND

An autonomous (or "self-driving") vehicle moving along a roadway with dedicated lanes requires knowledge of lane boundaries and of the position of the vehicle relative to the lane boundaries. When highly precise positioning and a high-definition (HD) map are available, the autonomous vehicle may rely on this data to determine lane boundaries. However, HD maps are unavailable in many situations, leaving the autonomous vehicle to identify lane boundaries in real-time using on-board imaging sensors and computer vision techniques. For example, the on-board imaging sensors may include a light detection and ranging (lidar) device to generate arrays of pixels depicting a road surface ahead of the vehicle.

However, using on-board imaging sensors and computer vision techniques to determine lane boundary positions is a formidable challenge largely because real-time data collection and analysis is processor-intensive. Particularly at higher speeds, an accurate determination of lane boundary position may not be possible before the autonomous vehicle reaches the area indicated in the real-time data. Without an accurate determination of lane boundary positions, the autonomous vehicle may drift into adjoining lanes and/or collide with other vehicles.

SUMMARY

Generally speaking, the methods of the present disclosure detect roadway lanes by accurately and efficiently identifying lane boundary positions. Moreover, the methods of the present disclosure may predict the location of the lane boundary positions beyond the range of the imaging systems (e.g., lidar systems) based on the identified lane boundary positions. In this manner, the systems and methods of the present disclosure achieve a notable technological improvement over conventional systems and methods by, inter alia, reducing the computational resources required to identify lane boundary positions.

In one embodiment, a method for detecting boundaries of lanes on a road comprises receiving, by one or more processors from an imaging system, a set of pixels associated with lane markings. The method further comprises partitioning, by the one or more processors, the set of pixels into a plurality of groups, wherein each of the plurality of groups is associated with one or more control points. The method further comprises generating, by the one or more processors, a spline that traverses the control points of the plurality of groups, such that the spline describes a boundary of a lane.

BRIEF DESCRIPTION OF THE DRAWINGS

FIG. 6D illustrates yet another example linking technique to join the points of the example point cloud of FIG. 6A.

DETAILED DESCRIPTION

Figure 1:
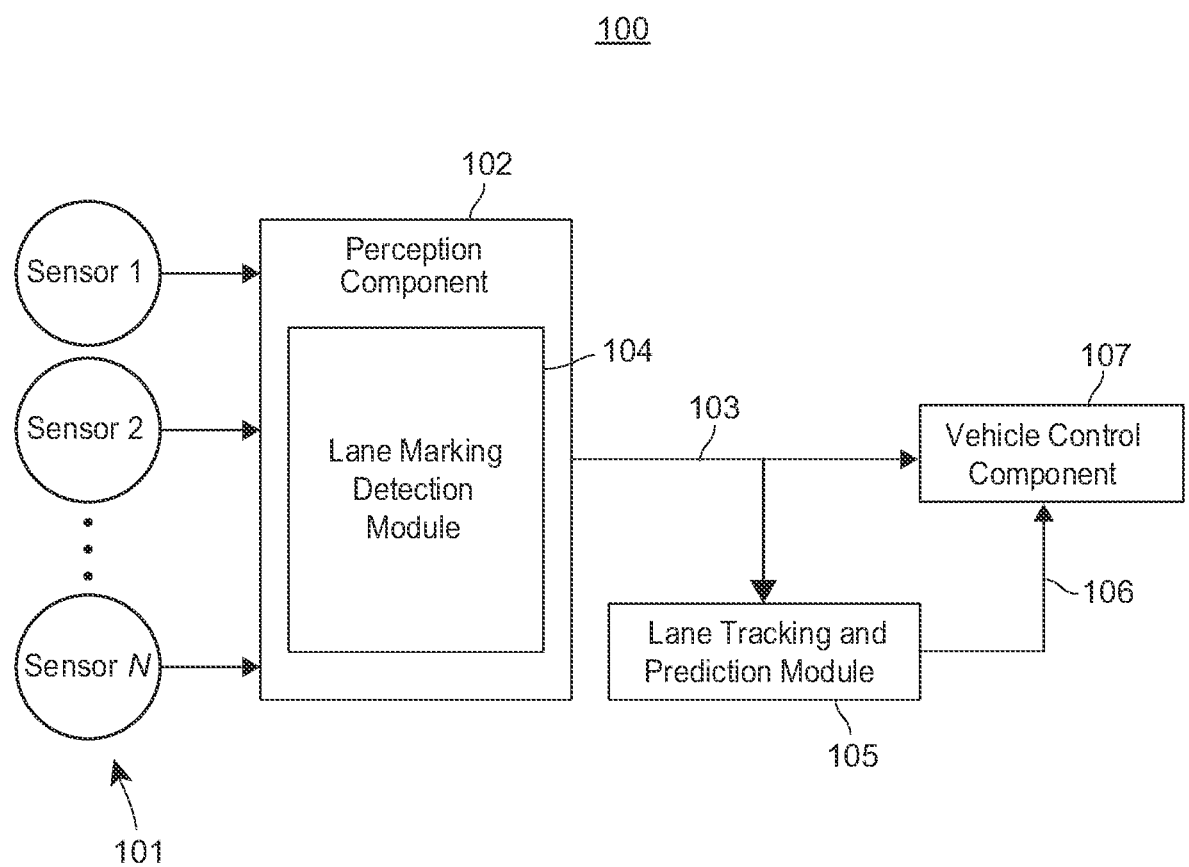
FIG. 1 is a block diagram of an example software architecture for controlling one or more operations of the vehicle based on detecting lane markings and/or predicting extensions of the lane markings within the vehicle's environment.

Software-based techniques of this disclosure are used to detect and track lane markings on a roadway, such that the lane markings may inform control operations of an autonomous vehicle. The vehicle may be a fully self-driving or "autonomous" vehicle, a vehicle controlled by a human driver, or some hybrid of the two. For example, the disclosed techniques may be used to capture vehicle environment information to improve the safety/performance of an autonomous vehicle, to generate alerts for a human driver, or simply to collect data relating to a particular driving trip. The sensors may be any type or types of sensors capable of sensing an environment through which the vehicle is moving, such as lidar, radar, cameras, and/or other types of sensors. The vehicle may also include other sensors, such as inertial measurement units (IMUs), and/or include other types of devices that provide information on the current position of the vehicle (e.g., a GPS unit).

Lane Marking Detection Overview

As mentioned, the methods of the present disclosure may provide lane marking detection and identification capabilities for autonomous vehicles. More specifically, systems implementing the methods of the present disclosure may receive pixels representative of the lane markings, and proceed to link the pixels together. The systems may also perform one or more techniques to ensure the linked pixels correspond to similar lanes. Once all pixels are linked to at most two other pixels, the systems may create one or more groups, including one or more control points. Finally, the systems may generate a spline traversing the control points. In this manner, the systems may effectively determine the location of each lane, as represented by the areas bounded by the splines. These techniques are described in greater detail below.

A system for detecting lane edges may first receive a set of pixels associated with roadway lanes. Each received pixel may include an identification, such that a particular subset of pixels will include lane identifications. For example, each pixel of the set of pixels may be representative of a lane marking, pixels within some threshold distance of the lane marking, or strips connecting lane markings. Thus, the pixels representative of a lane marking will include the lane identifications. In embodiments, the set of pixels may represent a section of roadway that extends ahead of a vehicle driving along the roadway, such that pixels near the top of the image are further away from the vehicle. As an example, the section of roadway may curve to the right, and have two lanes including a split between the two lanes some distance ahead of the vehicle.

Next, the system implementing the methods of the present disclosure may link pixels of the set of pixels together to create sections of linked pixels. In certain implementations, the system may link the pixels by starting at each of the "starting pixels" and evaluating the set of pixels for a nearest pixel within a certain radius of each of the starting pixels. The system may find a nearest pixel for each starting pixel, associate (e.g., link) the nearest pixel to the respective starting pixel, designate the nearest pixel as the current pixel, and proceed to attempt to link the current pixel to a nearest pixel in a forward direction (e.g., away from the vehicle). The system may iteratively link pixels together until each pixel is linked with at least one other pixel.

Alternatively, the system may perform the linking process by bounding the set of pixels upon receipt. The set of pixels may be bounded by a set of bounding boxes that delineate each lane marking based on the pixels included in each bounding box. Once bounded, the system may proceed to link pixels in a similar way as previously described, or in any other suitable fashion, but may not link two pixels across a bounding box. In this manner, the system assures that the linked pixels are not associated with two different lane identifications.

Moreover, in certain implementations, the lane identifications may further include connection indicators. These connection indicators may represent a directional dependence of a connection between two pixels. For example, two pixels (a first pixel and a second pixel) may be associated with the same lane identification, and may be connected such that the second pixel is located below and to the right of the first pixel. Accordingly, the connection indicator of the first pixel may indicate that the second pixel is connected to the first pixel through a connection below the first pixel and to the right of the first pixel.

In any event, the system implementing the methods of the present disclosure proceeds to link each pixel of the set of pixels to at least one other pixel from the set of pixels, creating a set of linked pixels. Afterwards, the system subdivides the set of linked pixels into groups of linked pixels. Each group of linked pixels includes two endpoints, also referenced herein as "control points." The system uses the control points of each group of linked pixels to determine connections between and among other groups of linked pixels. For example, the system may determine a principle component of the group of linked pixels. The principle component may have an associated direction, such as parallel to the direction of travel of the vehicle, perpendicular to the direction of travel of the vehicle, or any other potential direction.

Accordingly, the system implementing the methods of the present disclosure may examine the spatial relationships between and among various control points of the groups of pixels. For example, the system may determine a control link between two control points to measure the distance between the two control points to determine if the groups of pixels associated with the respective control points should be linked. In certain implementations, if the system determines the distance between the two control points is below a minimum threshold value, the respective groups of linked pixels may be linked by the two control points. If the system determines the distance between two control points is above the minimum threshold value but below a maximum threshold value, the system may measure the angle between the control link linking the two control points and the principal components of the respective groups of linked pixels. Additionally or alternatively, the system may measure the angle between the principal components of the respective groups of linked pixels to determine whether the respective groups should be linked together. In either case, should the system determine that the angle is above a threshold, the system may not link the respective control groups. Finally, if the system determines the distance between two control points is above the maximum threshold value, the system may not link the respective groups of linked pixels.

Alternatively, in certain implementations, the system may utilize graph theory to link the groups of linked pixels. The system may construct a graph by first assigning each of the control points as nodes of the graph. The system may then connect each node to every other node of the graph by fitting a spline between each pair of nodes. It should be appreciated that the system may connect each pair of nodes using any suitable spline, such as a line, a cubic spiral, etc. The system may then designate each connection between two control points as a respective edge of the graph. The system may subsequently determine a cost for each edge of the graph by penalizing edges that cross barriers (e.g., regions between roads traveling in different directions, edges of a roadway, etc.), and incentivizing edges that follow lane markings. The cost evaluation may also include various other parameters, such as a drivability factor indicating the sharpness of any particular edge in comparison to the type of roadway (e.g., interstate, urban road). Finally, the system may designate a source node and a target node in order to traverse the graph, and determine the lowest-cost route to traverse through the graph. The system may output a group of lowest-cost paths, representing the lanes of the roadway. For example, each of the lowest-cost paths may include pairs of nodes, each pair of nodes joined together by a spline, and the splines between each pair of nodes of a lowest-cost path may be joined together to form a representation of a lane.

In either case, the system may generate groups of linked pixels that should be linked together. Thus, the system may fit a spline between the control points of the groups of linked pixels that the system has determined should be linked together. By fitting a spline between the control points, the system may generate an accurate representation of the lane markings without engaging in cumbersome, processor-intensive computations to fit a spline between all pixels of the groups of linked pixels. In this manner, the system implementing the methods of the present disclosure achieves a notable technological improvement over conventional systems by reducing the computational resources required to identify lane markings. As previously mentioned, it is to be appreciated that the system may utilize any suitable spline technique. For example, to link the control points together, the system may utilize a Catmull-Rom spline technique.

Lane Tracking and Prediction Overview

Broadly stated, a system implementing the methods of the present disclosure may predict the location of roadway lanes, in part, by using the splines generated as part of the lane marking detection process described above. In particular, the system may receive a set of pixels associated with lane markings, and proceed to generate the splines defining the boundaries of the roadway lanes. Afterwards, the system may generate a predicted extension of the spline in a direction in which the imaging system is moving, based on a curvature of at least a portion of the spline. A spline and a predicted extension of the spline, together, may be referred to as a predicted spline.

Accordingly, the system may use the determined lane markings to predict the locations of future lane markings. The system may begin the prediction process by extending the determined lane markings further ahead of the vehicle's current position based on the previous lane detection. For example, if the system determines that the lanes of the roadway are curving to the right, the system may predict that the future lane markings will be displaced further to the right of the vehicle than the determined lane markings. The system may further update the future lane location based on the motion of the vehicle. Moreover, the system may utilize prior lane marking predictions when predicting the locations of the future lane markings.

In any event, the system may generate a spline to fit the predicted lane marking locations. The system may then receive sensor data indicating the true locations of the lane markings. Using the sensor data, the system may determine an accuracy of the predicted lane marking locations, referenced in the present disclosure as a "likelihood score" ("L"). The system may generate numerous predictions, and determine a likelihood score L for each prediction. For each prediction, the system may use the corresponding likelihood score L to update and refine filters used in the predictive process.

Example Techniques for Lane Marking Detection and Tracking

Figure 9:
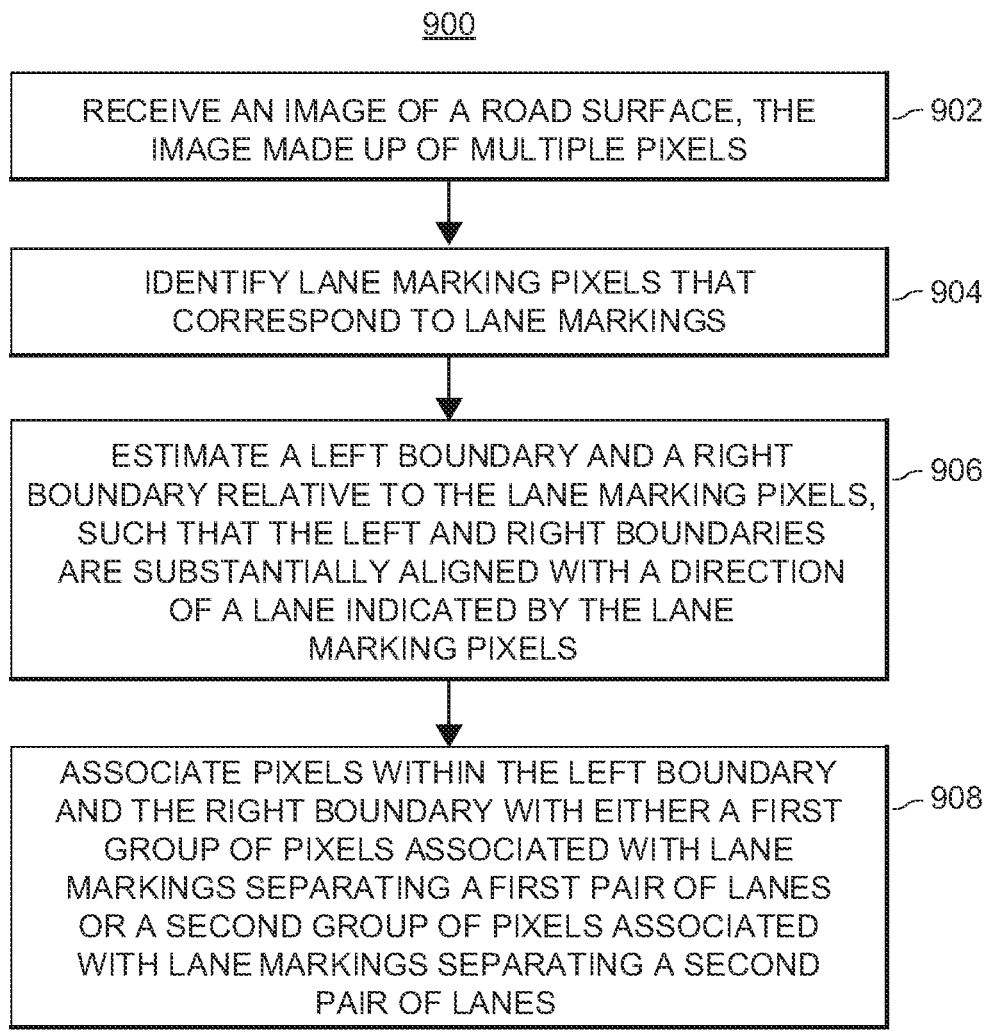
FIG. 9 is a flow diagram of a method for identifying pixels associated with lane markings.
Figure 10:
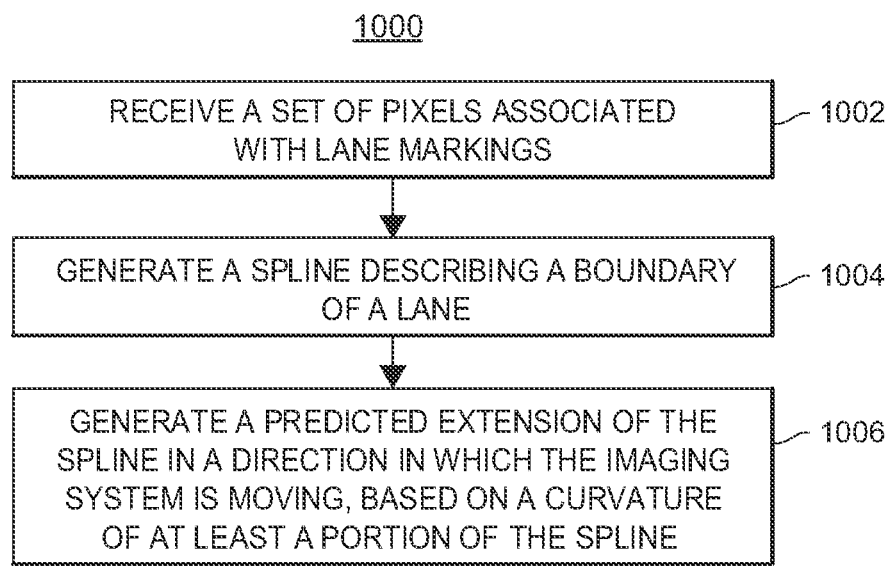
FIG. 10 is a flow diagram of a method for tracking a lane on a road.

In the discussion below, an example software architecture for controlling one or more operations of a vehicle based on detecting and/or predicting extensions of lane markings will first be discussed, with reference to FIG. 1. Because many of the architectures and techniques discussed herein may utilize lidar sensors, example lidar systems are then discussed with reference to FIGS. 2-5. FIGS. 6A-7B illustrate the use of the software architecture in detecting lane markings and predicting extensions of lane markings. Finally, example methods relating to detecting, identifying, and tracking (e.g., predicting extensions) lane markings are discussed with respect to the flow diagrams of FIGS. 8-10.

FIG. 1 illustrates an example, software-based, lane marking detection and tracking architecture 100, which is used to dynamically detect and track lane markings during operation of an autonomous vehicle. The lane marking detection and tracking architecture 100 includes one or more of sensors 101 that may be utilized by an autonomous vehicle (e.g., to make intelligent driving decisions based on the vehicle's current environment), or by a non-autonomous vehicle for other purposes (e.g., to collect data pertaining to a particular driving trip).

As the term is used herein, an "autonomous" or "self-driving" vehicle is a vehicle configured to sense its environment and navigate or drive with no human input, with little human input, with optional human input, and/or with circumstance-specific human input. For example, an autonomous vehicle may be configured to drive to any suitable location and control or perform all safety-critical functions (e.g., driving, steering, braking, parking) for the entire trip, with the driver not being expected (or even able) to control the vehicle at any time. As another example, an autonomous vehicle may allow a driver to safely turn his or her attention away from driving tasks in particular environments (e.g., on freeways) and/or in particular driving modes.

An autonomous vehicle may be configured to drive with a human driver present in the vehicle, or configured to drive with no human driver present. As an example, an autonomous vehicle may include a driver's seat with associated controls (e.g., steering wheel, accelerator pedal, and brake pedal), and the vehicle may be configured to drive with no one seated in the driver's seat or with limited, conditional, or no input from a person seated in the driver's seat. As another example, an autonomous vehicle may not include any driver's seat or associated driver's controls, with the vehicle performing substantially all driving functions (e.g., driving, steering, braking, parking, and navigating) at all times without human input (e.g., the vehicle may be configured to transport human passengers or cargo without a driver present in the vehicle). As another example, an autonomous vehicle may be configured to operate without any human passengers (e.g., the vehicle may be configured for transportation of cargo without having any human passengers onboard the vehicle).

As the term is used herein, a "vehicle" may refer to a mobile machine configured to transport people or cargo. For example, a vehicle may include, may take the form of, or may be referred to as a car, automobile, motor vehicle, truck, bus, van, trailer, off-road vehicle, farm vehicle, lawn mower, construction equipment, golf cart, motorhome, taxi, motorcycle, scooter, bicycle, skateboard, train, snowmobile, watercraft (e.g., a ship or boat), aircraft (e.g., a fixed-wing aircraft, helicopter, or dirigible), or spacecraft. In particular embodiments, a vehicle may include an internal combustion engine or an electric motor that provides propulsion for the vehicle.

As seen in FIG. 1, the vehicle includes N different sensors 101, with N being any suitable integer (e.g., 1, 2, 3, 5, 10, 20, etc.). At least "Sensor 1" of the sensors 101 is configured to sense the environment of the autonomous vehicle by physically interacting with the environment in some way, such as by transmitting and receiving laser light that reflects or scatters off of objects in the environment (e.g., if the sensor is a lidar device), transmitting and receiving radio or acoustic signals that reflect off of objects in the environment (e.g., if the sensor is a radar or sonar device), simply receiving light waves generated or reflected from different areas of the environment (e.g., if the sensor is a camera), and so on. In embodiments, all of the sensors 101 (e.g., "Sensor 1," "Sensor 2," . . . , and "Sensor N") may be configured to sense portions of the environment, or one or more of the sensors 101 may not physically interact with the external environment (e.g., if one of the sensors 101 is an inertial measurement unit (IMU)). The sensors 101 may all be of the same type, or may include a number of different sensor types (e.g., multiple lidar devices with different viewing perspectives, and/or a combination of lidar, camera, radar, and thermal imaging devices, etc.).

The data generated by the sensors 101 is input to a perception component 102 of the lane marking detection and tracking architecture 100, and is processed by the perception component 102 to generate perception signals 103 descriptive of a current state of the vehicle's environment. It is understood that the term "current" may actually refer to a very short time prior to the generation of any given perception signals 103, e.g., due to the short processing delay introduced by the at least some portions of the perception component 102 and other factors. A separate lane marking detection module 104 may generate perception signals associated with detected lane markings with a shorter processing delay than the more computationally intensive modules associated with object classification, for example.

The lane marking detection and tracking architecture 100 also includes a lane tracking and prediction module 105, which processes the perception signals 103 to generate prediction signals 106 descriptive of one or more predicted future states of the vehicle's environment. For example, the lane tracking and prediction module 105 may analyze the positions and directions of the lane markings identified in the perception signals 103 generated by the lane marking detection module 104 to predict one or more extensions of the lane markings. As a relatively simple example, the lane tracking and prediction module 105 may assume that any moving objects will continue to travel with no change to their current direction and speed, possibly taking into account first-or higher-order derivatives to better track objects that have continuously changing directions, objects that are accelerating, and so on. Additionally or alternatively, the lane tracking and prediction module 105 may utilize past perception signals 103 generated by the lane marking detection module 104 to supplement and/or refine the operations of the lane tracking and prediction module 105 when generating the prediction signals 106.

In embodiments, the perception signals 103 and the prediction signals 106 are used to control one or more operations of a vehicle. For example, the signals 103, 106 may be input to a vehicle control component 107, which processes the signals 103, 106 to generate vehicle control signals (not shown) that control one or more operations of the vehicle. In particular, the vehicle control component 107 may generate a vehicle control signal to adjust the orientation of the front tires of the vehicle. Adjusting the orientation of the front tires in accordance with the vehicle control signal may cause the vehicle to maintain a safe, central position within a lane defined by the lane markings described by the signals 103, 106.

As seen from various examples provided above, sensor data collected by a vehicle may in some embodiments include point cloud data that is generated by one or more lidar devices or, more generally, a lidar system. To provide a better understanding of the types of data that may be generated by lidar systems, and of the manner in which lidar systems and devices may function, example lidar systems and point clouds will now be described with reference to FIGS. 2-5.

Figure 2:
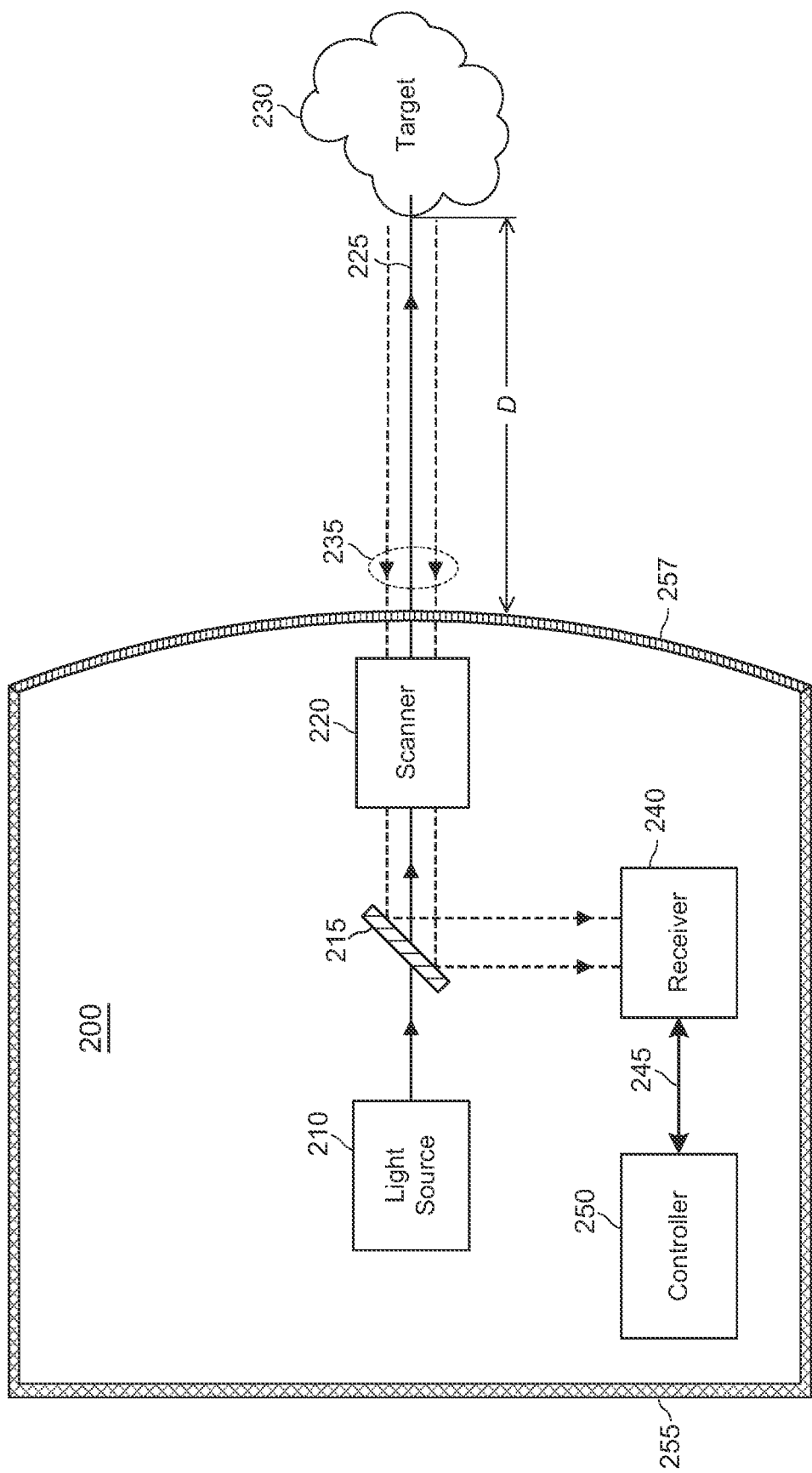
FIG. 2 is a block diagram of an example light detection and ranging (lidar) system that may be controlled using the sensor control architecture of FIG. 1.

Referring first to FIG. 2, a lidar system 200 may be used as at least one of the sensors 101 of FIG. 1, for example. While various lidar system components and characteristics are described herein, it is understood that any suitable lidar device(s) or system(s), and/or any other suitable types of sensors, may provide sensor data for processing using the software architectures described herein.

The example lidar system 200 may include a light source 210, a mirror 215, a scanner 220, a receiver 240, and a controller 250. The light source 210 may be, for example, a laser (e.g., a laser diode) that emits light having a particular operating wavelength in the infrared, visible, or ultraviolet portions of the electromagnetic spectrum. In operation, the light source 210 emits an output beam of light 225 which may be continuous-wave, pulsed, or modulated in any suitable manner for a given application. The output beam of light 225 is directed downrange toward a remote target 230 located a distance D from the lidar system 200 and at least partially contained within a field of regard of the system 200.

Once the output beam 225 reaches the downrange target 230, the target 230 may scatter or, in some cases, reflect at least a portion of light from the output beam 225, and some of the scattered or reflected light may return toward the lidar system 200. In the example of FIG. 2, the scattered or reflected light is represented by input beam 235, which passes through the scanner 220, which may be referred to as a beam scanner, optical scanner, or laser scanner. The input beam 235 passes through the scanner 220 to the mirror 215, which may be referred to as an overlap mirror, superposition mirror, or beam-combiner mirror. The mirror 215 in turn directs the input beam 235 to the receiver 240.

The input beam 235 may include light from the output beam 225 that is scattered by the target 230, light from the output beam 225 that is reflected by the target 230, or a combination of scattered and reflected light from target 230. According to some implementations, the lidar system 200 can include an "eye-safe" laser that present little or no possibility of causing damage to a person's eyes. The input beam 235 may contain only a relatively small fraction of the light from the output beam 225.

The receiver 240 may receive or detect photons from the input beam 235 and generate one or more representative signals. For example, the receiver 240 may generate an output electrical signal 245 that is representative of the input beam 235. The receiver may send the electrical signal 245 to the controller 250. Depending on the implementation, the controller 250 may include one or more instruction-executing processors, an application-specific integrated circuit (ASIC), a field-programmable gate array (FPGA), and/or other suitable circuitry configured to analyze one or more characteristics of the electrical signal 245 in order to determine one or more characteristics of the target 230, such as its distance downrange from the lidar system 200. More particularly, the controller 250 may analyze the time of flight or phase modulation for the beam of light 225 transmitted by the light source 210. If the lidar system 200 measures a time of flight of T (e.g., T representing a round-trip time of flight for an emitted pulse of light to travel from the lidar system 200 to the target 230 and back to the lidar system 200), then the distance D from the target 230 to the lidar system 200 may be expressed as $D = c \cdot T/2$, where c is the speed of light (approximately $3.0 \times 10^8$ m/s).

The distance D from the lidar system 200 is less than or equal to a maximum range $R_{MAX}$ of the lidar system 200.

The maximum range $R_{MAX}$ (which also may be referred to as a maximum distance) of a lidar system 200 may correspond to the maximum distance over which the lidar system 200 is configured to sense or identify targets that appear in a field of regard of the lidar system 200. The maximum range of lidar system 200 may be any suitable distance, such as 50 m, 200 m, 500 m, or 1 km, for example.

In some implementations, the light source 210, the scanner 220, and the receiver 240 may be packaged together within a single housing 255, which may be a box, case, or enclosure that holds or contains all or part of the lidar system 200. The housing 255 includes a window 257 through which the beams 225 and 235 pass. The controller 250 may reside within the same housing 255 as the components 210, 220, and 240, or the controller 250 may reside outside of the housing 255. In one embodiment, for example, the controller 250 may instead reside within, or partially within, the perception component 102 of the lane marking detection and tracking architecture 100 shown in FIG. 1. In some implementations, the housing 255 includes multiple lidar sensors, each including a respective scanner and a receiver. Depending on the particular implementation, each of the multiple sensors can include a separate light source or a common light source. The multiple sensors can be configured to cover non-overlapping adjacent fields of regard or partially overlapping fields of regard, for example, depending on the implementation.

With continued reference to FIG. 2, the output beam 225 and input beam 235 may be substantially coaxial. In other words, the output beam 225 and input beam 235 may at least partially overlap or share a common propagation axis, so that the input beam 235 and the output beam 225 travel along substantially the same optical path (albeit in opposite directions). As the lidar system 200 scans the output beam 225 across a field of regard, the input beam 235 may follow along with the output beam 225, so that the coaxial relationship between the two beams is maintained.

Generally speaking, the scanner 220 steers the output beam 225 in one or more directions downrange. To accomplish this, the scanner 220 may include one or more scanning mirrors and one or more actuators driving the mirrors to rotate, tilt, pivot, or move the mirrors in an angular manner about one or more axes, for example. While FIG. 2 depicts only a single mirror 215, the lidar system 200 may include any suitable number of flat or curved mirrors (e.g., concave, convex, or parabolic mirrors) to steer or focus the output beam 225 or the input beam 235. For example, the first mirror of the scanner may scan the output beam 225 along a first direction, and the second mirror may scan the output beam 225 along a second direction that is substantially orthogonal to the first direction.

A "field of regard" of the lidar system 200 may refer to an area, region, or angular range over which the lidar system 200 may be configured to scan or capture distance information. When the lidar system 200 scans the output beam 225 within a 30-degree scanning range, for example, the lidar system 200 may be referred to as having a 30-degree angular field of regard. The scanner 220 may be configured to scan the output beam 225 horizontally and vertically, and the field of regard of the lidar system 200 may have a particular angular width along the horizontal direction and another particular angular width along the vertical direction. For example, the lidar system 200 may have a horizontal field of regard of 10° to 120° and a vertical field of regard of 2° to 45°.

The one or more scanning mirrors of the scanner 220 may be communicatively coupled to the controller 250, which may control the scanning mirror(s) so as to guide the output beam 225 in a desired direction downrange or along a desired scan pattern. In general, a scan (or scan line) pattern may refer to a pattern or path along which the output beam 225 is directed. The lidar system 200 can use the scan pattern to generate a point cloud with points or "pixels" that substantially cover the field of regard. The pixels may be approximately evenly distributed across the field of regard, or distributed according to a particular non-uniform distribution.

In operation, the light source 210 may emit pulses of light which the scanner 220 scans across a field of regard of the lidar system 200. The target 230 may scatter one or more of the emitted pulses, and the receiver 240 may detect at least a portion of the pulses of light scattered by the target 230. The receiver 240 may receive or detect at least a portion of the input beam 235 and produce an electrical signal that corresponds to the input beam 235. The controller 250 may be electrically coupled or otherwise communicatively coupled to one or more of the light source 210, the scanner 220, and the receiver 240. The controller 250 may provide instructions, a control signal, or a trigger signal to the light source 210 indicating when the light source 210 should produce optical pulses, and possibly characteristics (e.g., duration, period, peak power, wavelength, etc.) of the pulses. The controller 250 may also determine a time-of-flight value for an optical pulse based on timing information associated with when the pulse was emitted by light source 210 and when a portion of the pulse (e.g., the input beam 235) was detected or received by the receiver 240.

As indicated above, the lidar system 200 may be used to determine the distance to one or more downrange targets 230. By scanning the lidar system 200 across a field of regard, the system can be used to map the distance to a number of points within the field of regard. Each of these depth-mapped points may be referred to as a pixel or a voxel. A collection of pixels captured in succession (which may be referred to as a depth map, a point cloud, or a point cloud frame) may be rendered as an image or may be analyzed to identify or detect objects or to determine a shape or distance of objects within the field of regard. For example, a depth map may cover a field of regard that extends 60° horizontally and 15° vertically, and the depth map may include a frame of 100-2000 pixels in the horizontal direction by 4-400 pixels in the vertical direction.

The lidar system 200 may be configured to repeatedly capture or generate point clouds of a field of regard at any suitable frame rate between approximately 0.1 frames per second (FPS) and approximately 1,000 FPS, for example. The point cloud frame rate may be substantially fixed or dynamically adjustable, depending on the implementation. In general, the lidar system 200 can use a slower frame rate (e.g., 1 Hz) to capture one or more high-resolution point clouds, and use a faster frame rate (e.g., 10 Hz) to rapidly capture multiple lower-resolution point clouds.

The field of regard of the lidar system 200 can overlap, encompass, or enclose at least a portion of the target 230, which may include all or part of an object that is moving or stationary relative to lidar system 200. For example, the target 230 may include all or a portion of a person, vehicle, motorcycle, truck, train, bicycle, wheelchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects.

Figure 3:
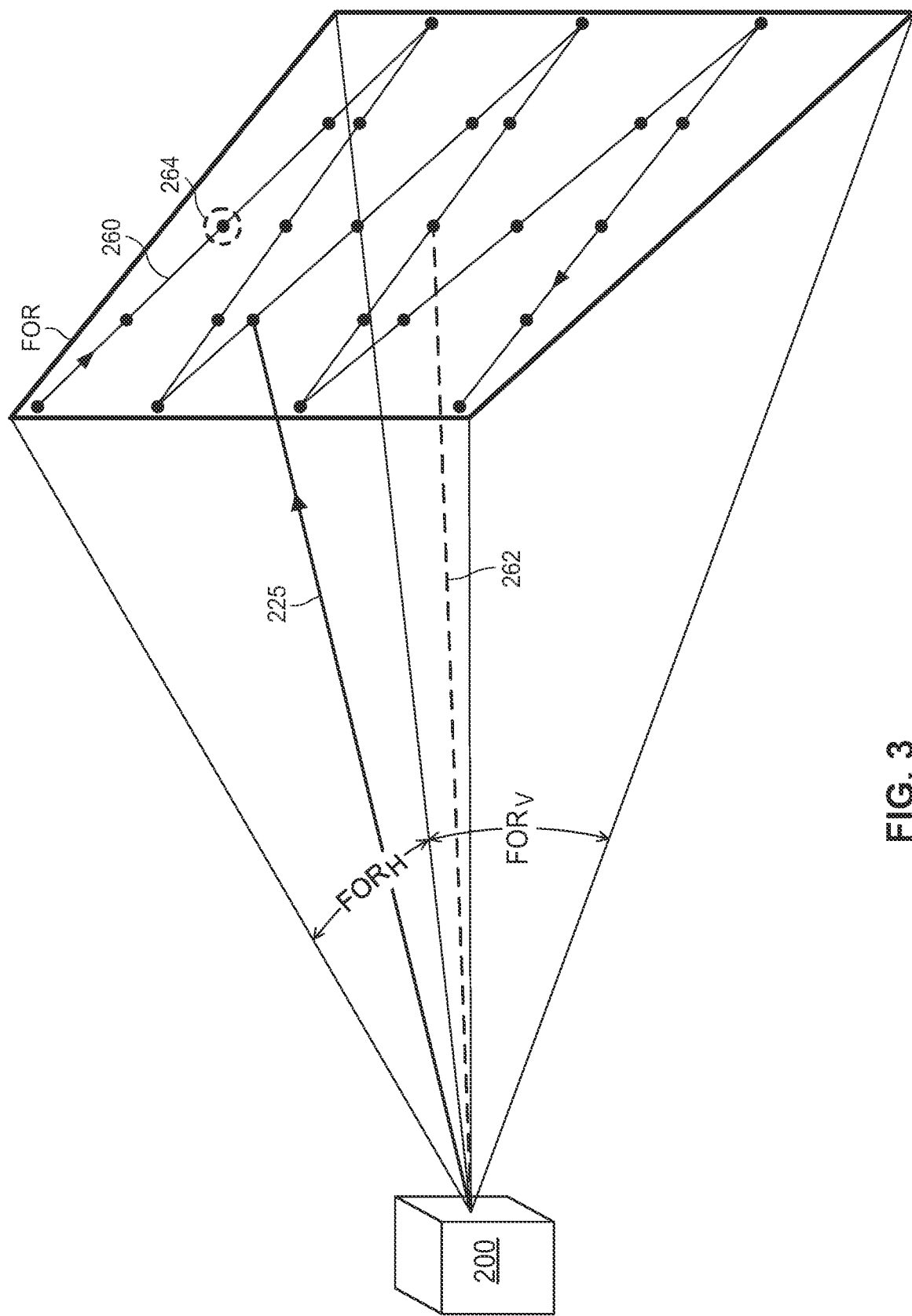
FIG. 3 illustrates an example scan pattern which the lidar system of FIG. 2 may produce when identifying targets within a field of regard.

FIG. 3 illustrates an example scan pattern 260 which the lidar system 200 of FIG. 2 may produce. In particular, the lidar system 200 may be configured to scan the output optical beam 225 along the scan pattern 260. In some implementations, the scan pattern 260 corresponds to a scan across any suitable field of regard having any suitable horizontal field of regard ($FOR_H$) and any suitable vertical field of regard ($FOR_V$). For example, a certain scan pattern may have a field of regard represented by angular dimensions (e.g., $FOR_H \times FOR_V$) 40°×30°, 90°×40°, or 60°×15°. While FIG. 3 depicts a "zig-zag" pattern 260, other implementations may instead employ other patterns (e.g., parallel, horizontal scan lines), and/or other patterns may be employed in specific circumstances.

In the example implementation and/or scenario of FIG. 3, reference line 262 represents a center of the field of regard of scan pattern 260. In FIG. 3, if the scan pattern 260 has a 60°×15° field of regard, then the scan pattern 260 covers a ±30° horizontal range with respect to reference line 262 and a ±7.5° vertical range with respect to reference line 262. An azimuth (which may be referred to as an azimuth angle) may represent a horizontal angle with respect to the reference line 262, and an altitude (which may be referred to as an altitude angle, elevation, or elevation angle) may represent a vertical angle with respect to the reference line 262.

The scan pattern 260 may include multiple points or pixels 264, and each pixel 264 may be associated with one or more laser pulses and one or more corresponding distance measurements. A cycle of scan pattern 260 may include a total of $P_x \times P_y$ pixels 264 (e.g., a two-dimensional distribution of a by a pixels). The number of pixels 264 along a horizontal direction may be referred to as a horizontal resolution of the scan pattern 260, and the number of pixels 264 along a vertical direction may be referred to as a vertical resolution of the scan pattern 260.

Each pixel 264 may be associated with a distance/depth (e.g., a distance to a portion of a target 230 from which the corresponding laser pulse was scattered) and one or more angular values. As an example, the pixel 264 may be associated with a distance value and two angular values (e.g., an azimuth and altitude) that represent the angular location of the pixel 264 with respect to the lidar system 200. A distance to a portion of the target 230 may be determined based at least in part on a time-of-flight measurement for a corresponding pulse. More generally, each point or pixel 264 may be associated with one or more parameter values in addition to its two angular values. For example, each point or pixel 264 may be associated with a depth (distance) value, an intensity value as measured from the received light pulse, and/or one or more other parameter values, in addition to the angular values of that point or pixel.

An angular value (e.g., an azimuth or altitude) may correspond to an angle (e.g., relative to reference line 262) of the output beam 225 (e.g., when a corresponding pulse is emitted from lidar system 200) or an angle of the input beam 235 (e.g., when an input signal is received by lidar system 200). In some implementations, the lidar system 200 determines an angular value based at least in part on a position of a component of the scanner 220. For example, an azimuth or altitude value associated with the pixel 264 may be determined from an angular position of one or more corresponding scanning mirrors of the scanner 220. The zero elevation, zero azimuth direction corresponding to the reference line 262 may be referred to as a neutral look direction (or neutral direction of regard) of the lidar system 200.

Figure 4A:
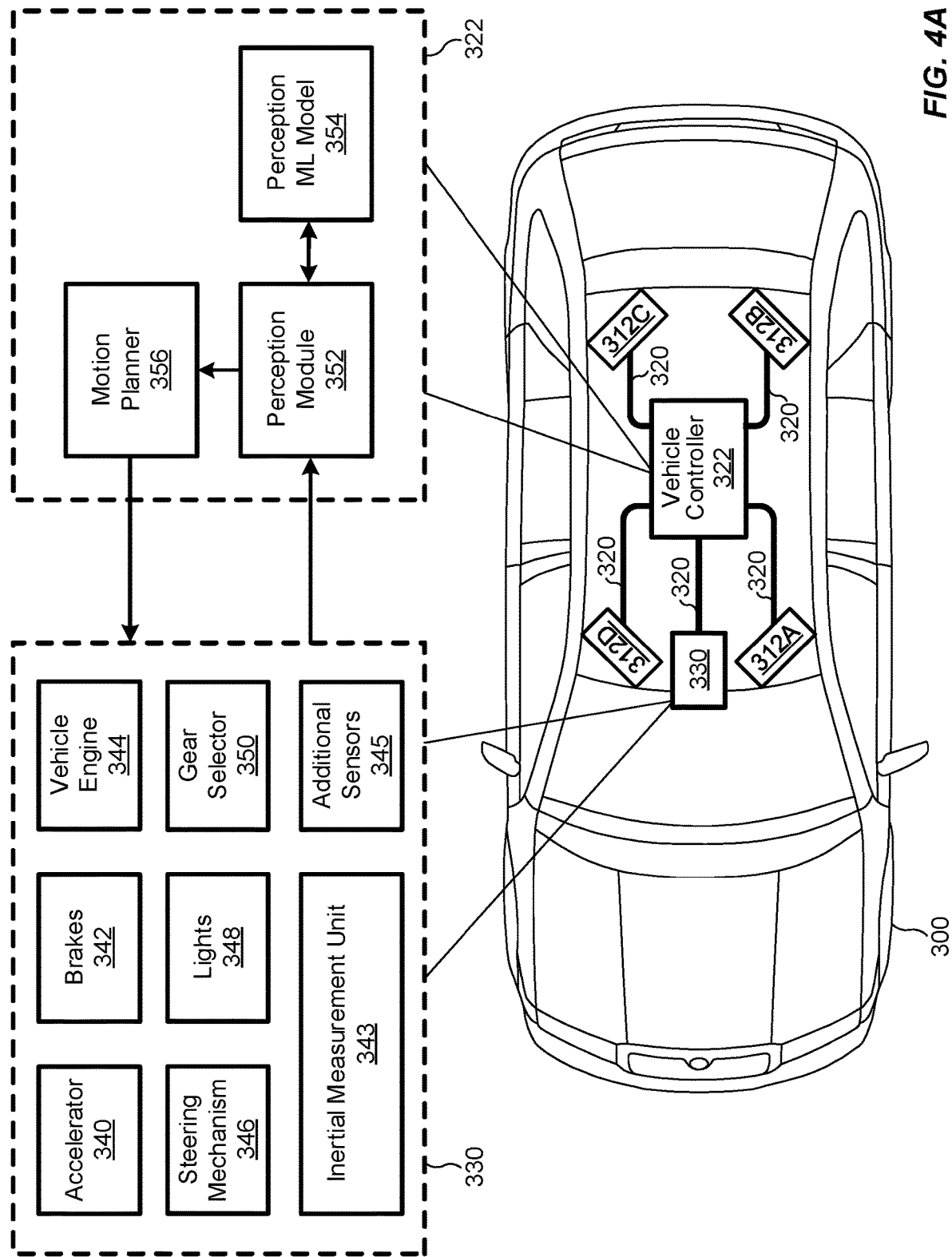
FIG. 4A illustrates an example vehicle in which the lidar system of FIG. 2 may operate.

FIG. 4A illustrates an example vehicle 300 with a lidar system 302. The lidar system 302 includes multiple sensor heads 312A-312D, each of which is equipped with a respective laser. Alternatively, the sensor heads 312A-D can be coupled to a single laser via suitable laser-sensor links. In general, each of the sensor heads 312 may include some or all of the components of the lidar system 200 illustrated in FIG. 2.

The sensor heads 312 in FIG. 4A are positioned or oriented to provide a greater than 30-degree view of an environment around the vehicle. More generally, a lidar system with multiple sensor heads may provide a horizontal field of regard around a vehicle of approximately 30°, 45°, 60°, 90°, 120°, 180°, 270°, or 360°. Each of the sensor heads 312 may be attached to, or incorporated into, a bumper, fender, grill, side panel, spoiler, roof, headlight assembly, taillight assembly, rear-view mirror assembly, hood, trunk, window, or any other suitable part of the vehicle.

In the example of FIG. 4A, four sensor heads 312 are positioned at or near the four corners of the vehicle (e.g., each of the sensor heads 312 may be incorporated into a light assembly, side panel, bumper, or fender), and the laser 310 may be located within the vehicle 300 (e.g., in or near the trunk). The four sensor heads 312 may each provide a 90° to 120° horizontal field of regard (FOR), and the four sensor heads 312 may be oriented so that together they provide a complete 360-degree view around the vehicle. As another example, the lidar system 302 may include six sensor heads 312 positioned on or around the vehicle 300, where each of the sensor heads 312 provides a 60° to 90° horizontal FOR. As another example, the lidar system 302 may include eight sensor heads 312, and each of the sensor heads 312 may provide a 45° to 60° horizontal FOR. As yet another example, the lidar system 302 may include six sensor heads 312, where each of the sensor heads 312 provides a 70° horizontal FOR with an overlap between adjacent FORs of approximately 10°. As another example, the lidar system 302 may include two sensor heads 312 which together provide a forward-facing horizontal FOR of greater than or equal to 30°5.

Data from each of the sensor heads 312 may be combined or stitched together to generate a point cloud that covers a greater than or equal to 30-degree horizontal view around a vehicle. For example, the laser 310 may include a controller or processor that receives data from each of the sensor heads 312 (e.g., via a corresponding electrical link 320) and processes the received data to construct a point cloud covering a 360-degree horizontal view around a vehicle or to determine distances to one or more targets. The point cloud or information from the point cloud may be provided to a vehicle controller 322 via a corresponding electrical, optical, or radio link 320. The vehicle controller 322 may include one or more CPUs, GPUs, and a non-transitory memory with persistent components (e.g., flash memory, an optical disk) and/or non-persistent components (e.g., RAM).

In some implementations, the point cloud is generated by combining data from each of the multiple sensor heads 312 at a controller included within the laser 310, and is provided to the vehicle controller 322. In other implementations, each of the sensor heads 312 includes a controller or processor that constructs a point cloud for a portion of the 360-degree horizontal view around the vehicle and provides the respective point cloud to the vehicle controller 322. The vehicle controller 322 then combines or stitches together the points clouds from the respective sensor heads 312 to construct a combined point cloud covering a 360-degree horizontal view. Still further, the vehicle controller 322 in some implementations communicates with a remote server to process point cloud data.

In any event, the vehicle 300 may be an autonomous vehicle where the vehicle controller 322 provides control signals to various components 330 within the vehicle 350 to maneuver and otherwise control operation of the vehicle 350. The components 330 are depicted in an expanded view in FIG. 4A for ease of illustration only. The components 330 may include an accelerator 340, brakes 342, a vehicle engine 344, a steering mechanism 346, lights 348 such as brake lights, head lights, reverse lights, emergency lights, etc., a gear selector 350, an IMU 343, additional sensors 345 (e.g., cameras, radars, acoustic sensors, atmospheric pressure sensors, moisture sensors, ambient light sensors, as indicated below) and/or other suitable components that effectuate and control movement of the vehicle 300. The gear selector 350 may include the park, reverse, neutral, drive gears, etc. Each of the components 330 may include an interface via which the component receives commands from the vehicle controller 322 such as "increase speed," "decrease speed," "turn left 5 degrees," "activate left turn signal," etc. and, in some cases, provides feedback to the vehicle controller 322.

The vehicle controller 322 can include a perception module 352 that receives input from the components 300 and uses a perception machine learning (ML) model 354 to provide indications of detected objects, road markings, etc. to a motion planner 356, which generates commands for the components 330 to maneuver the vehicle 300. Referring back to FIG. 1, the components 352-356 in one embodiment implement the components 102-107, in any suitable configuration.

In some implementations, the vehicle controller 322 receives point cloud data from the sensor heads 312 via the links 320 and analyzes the received point cloud data, using any one or more of the aggregate or individual SDCAs disclosed herein, to sense or identify targets 230 (see FIG. 2) and their respective locations, distances, speeds, shapes, sizes, type of target (e.g., vehicle, human, tree, animal), etc. The vehicle controller 322 then provides control signals via another link 320 to the components 330 to control operation of the vehicle based on the analyzed information.

In addition to the lidar system 302, the vehicle 300 may also be equipped with other sensors 345 such as a camera, a thermal imager, a conventional radar (none illustrated to avoid clutter), etc. The sensors can provide additional data to the vehicle controller 322 via wired or wireless communication links. Further, the vehicle 300 in an example implementation includes a microphone array operating as a part of an acoustic source localization system configured to determine sources of sounds.

Figure 4B:
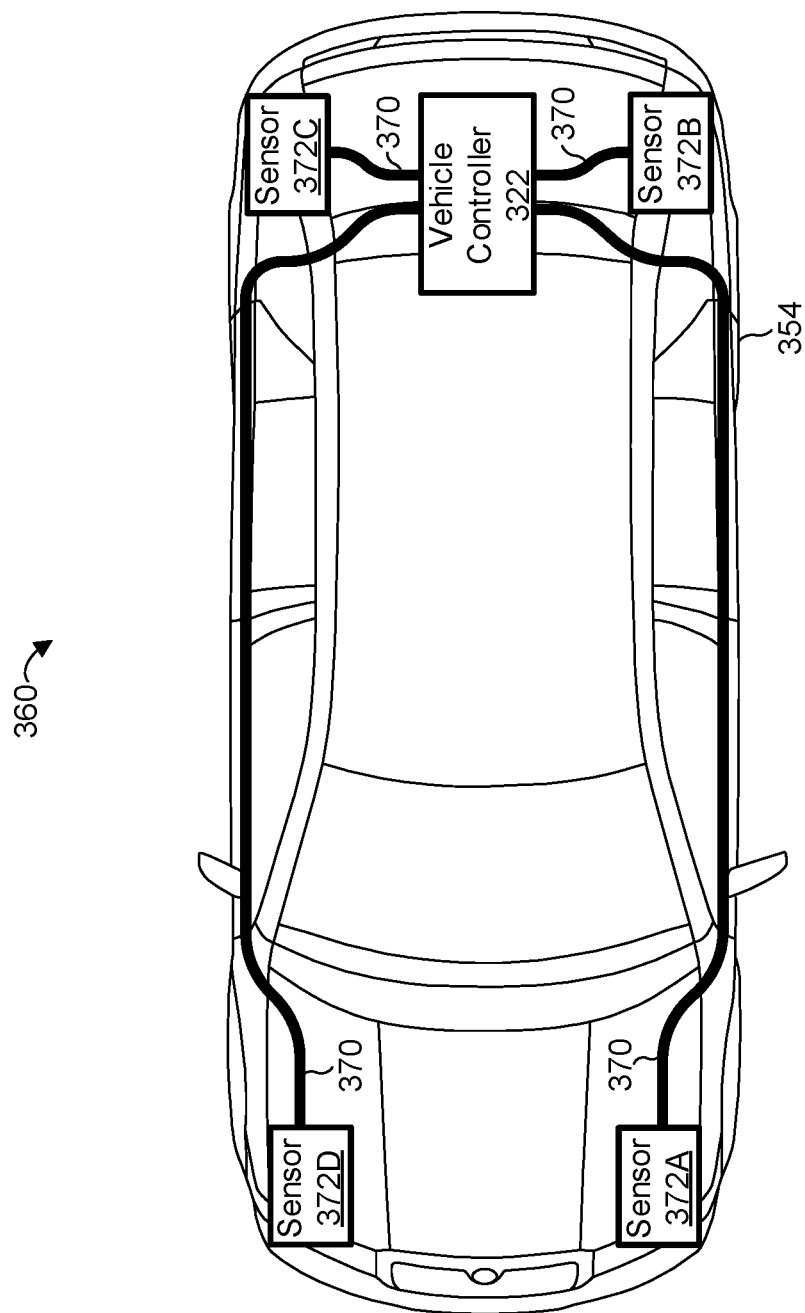
FIG. 4B illustrates another example vehicle in which the lidar system of FIG. 2 may operate.

As another example, FIG. 4B illustrates a vehicle 360 in which several sensor heads 372, each of which may be similar to one of the sensor heads 312 of FIG. 4A, are disposed at the front of the hood and on the trunk. In particular, the sensor heads 372B and C are oriented to face backward relative to the orientation of the vehicle 360, and the sensor heads 372A and D are oriented to face forward relative to the orientation of the vehicle 360. In another implementation, additional sensors are disposed at the side view mirrors, for example.

Figure 5:
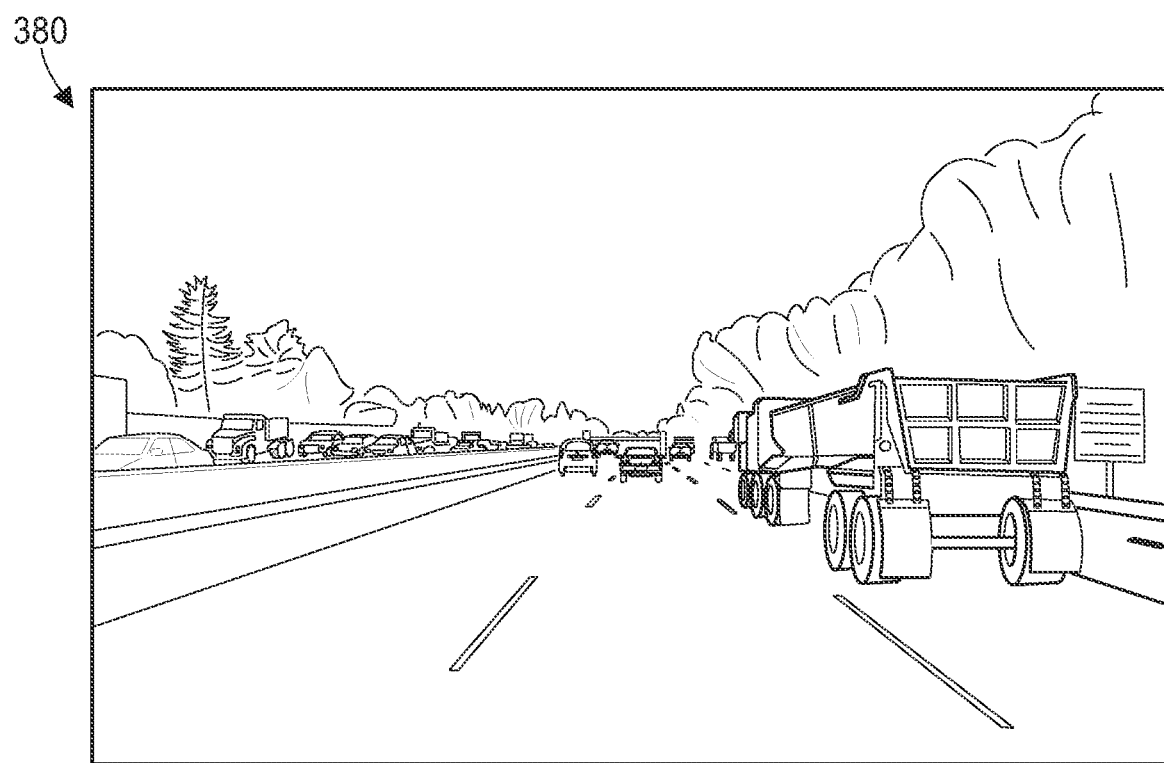
FIG. 5 illustrates an example environment in the direction of travel of an autonomous vehicle.
Figure 6A:
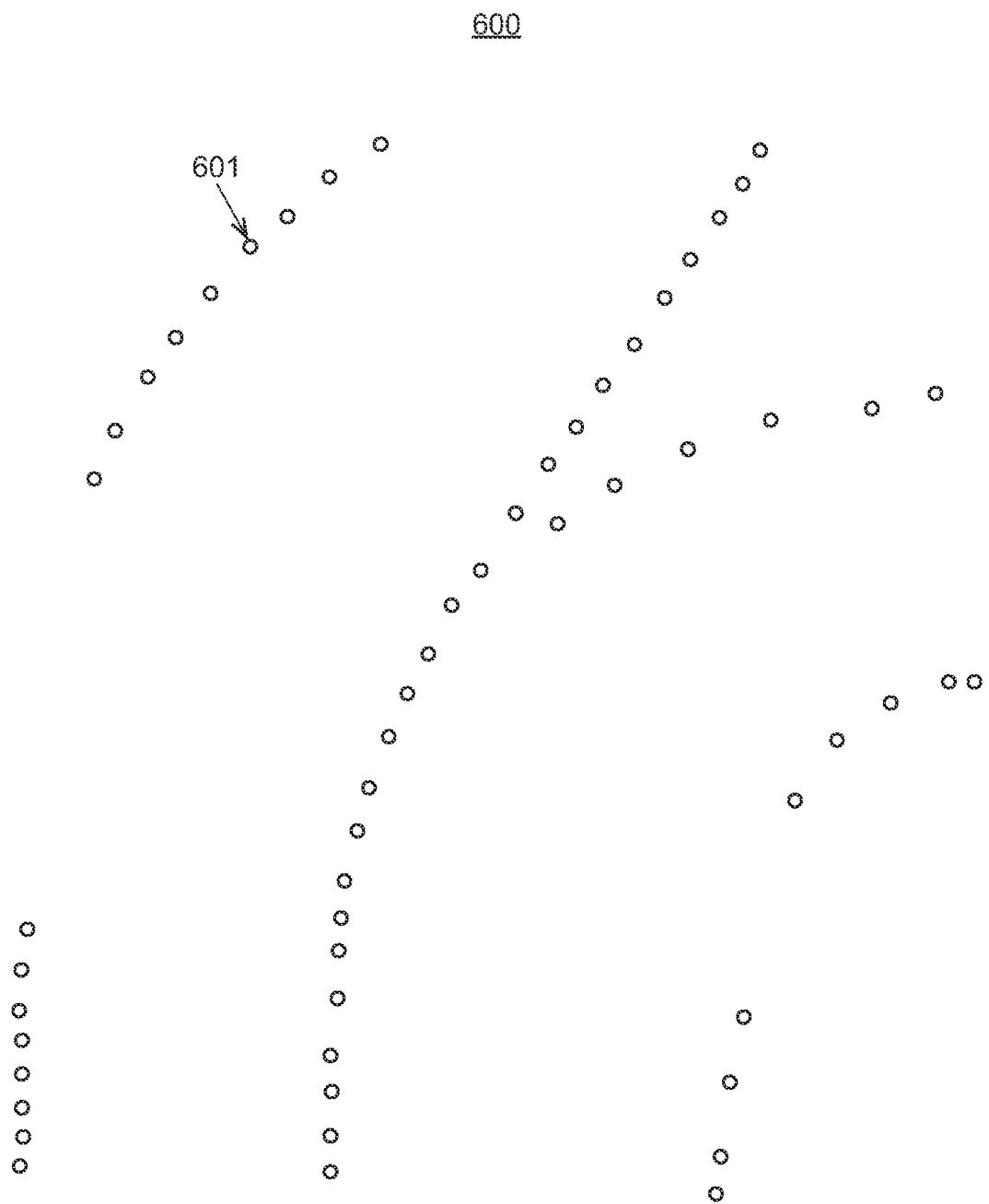
FIG. 6A illustrates an example point cloud that may be generated for an environment similar to the environment of FIG. 5.

FIG. 5 depicts an example real-world driving environment 380, and FIG. 6A depicts an example point cloud 600 that is generated by a lidar system scanning the environment 380 (e.g., the lidar system 200 of FIGS. 2 and 3 or the lidar system 302 of FIG. 4A). As seen in FIG. 5, the environment 380 includes a highway with a median wall that divides the two directions of traffic, with multiple lanes in each direction. The point cloud 600 of FIG. 6A corresponds to an example embodiment in which a lidar device captures a plurality of pixel data wherein each pixel 601 corresponds to a lane marking associated with a lane of a roadway. The pixels 601 of point cloud 600 may be obtained after a classification operation has been performed on a full point cloud. A full point cloud may include a three-dimensional rendering of a scene captured by a lidar system, and a classification operation may classify each pixel of the full point cloud as a particular type of pixel (e.g., road surface, lane marking, lane boundary, vehicle, bike, sign, etc.). The pixels 601 in FIG. 6A may be selected to include only the pixels from the full point cloud that are relevant to lane detection or tracking. For example, the pixels 601 may be selected if they are designated as: lane marking pixels, lane boundary pixels, or road surface pixels within a threshold distance of a lane marking or lane boundary. The point cloud 600 may have been generated using the sensor heads 312A and 312D of FIG. 4A, or the sensor heads 372A and 372G of FIG. 4B, for example. The point cloud 600, through merging data from more than one sensor head (e.g., sensor heads 372A and 372G) may assign to each point a range, an azimuth, and an elevation, with respect to a common origin point and reference look direction. The common origin may be designated as the average position and neutral look direction of the multiple sensor heads, or any other convenient point and/or look direction. While depicted as a visual image in FIG. 6A, it is understood that, in some embodiments, the point cloud 600 is not actually rendered or displayed at any time.

As used herein, the term "lane boundary" may refer to a lane marking such as solid white or yellow line or a broken white or yellow line, for example. Two adjacent lane boundaries define the edges of a lane in which a vehicle may travel. Moreover, a "left boundary" and a "right boundary" may correspond to the left and right edges of a lane boundary, respectively. For example, adjacent lane boundaries may be separated by a distance of approximately 12 feet, corresponding to the width of a lane, and the left and right boundaries may be separated by approximately 6 inches, corresponding to the width of typical markings defining a lane boundary.

As seen in FIG. 6A, the point cloud 600 represents lane markings associated with two lanes of a roadway and an exit ramp. For clarity, only a small number of the objects shown in FIG. 6A are labeled with a reference number. Referring back to FIG. 1, distinct ones of the objects (e.g., pixel 601) within the point cloud 600 may be identified by the perception component 102. For example, the perception component 102 may detect substantial gaps and/or other discontinuities in scan lines of the ground plane of the point cloud 600, and identify groups of points in the vicinity of those discontinuities as discrete objects. The perception component 102 may determine which points belong to the same object using any suitable rules, algorithms or models. Once the objects are identified, the perception component 102 and/or lane tracking and prediction module 105 of FIG. 1 may attempt to classify and/or to track the objects across future point clouds similar to the point cloud 600 (i.e., across multiple point cloud frames).

More specifically, the perception component 102 may receive the point cloud 600 and identify each pixel represented therein (e.g., pixel 601) as a lane marking. In embodiments, each pixel in the point cloud 600 may arrive at the perception component 102 with predetermined identifications, such that the perception component 102 automatically associates the lane marking pixels. However, as illustrated in FIG. 6A, such a disjointed association of pixels (e.g., pixel 601) may be insufficient to guide the vehicle as it travels along the roadway. The vehicle control units (e.g., vehicle control component 107) may misinterpret gaps between lane marking pixels, and cause the vehicle to unexpectedly swerve, brake, accelerate, and/or any other control operation. To avoid such anomalous control operations, the perception component 102, specifically the lane marking detection module 104, may link the pixels represented in the point cloud 600 together to create an approximation of the actual lane marking. With the approximated lane marking, the perception component 102 may generate and transmit perception signals 103 to the vehicle control component 107 that accurately reflect the position of the vehicle within a lane of a roadway.

Figure 6B:
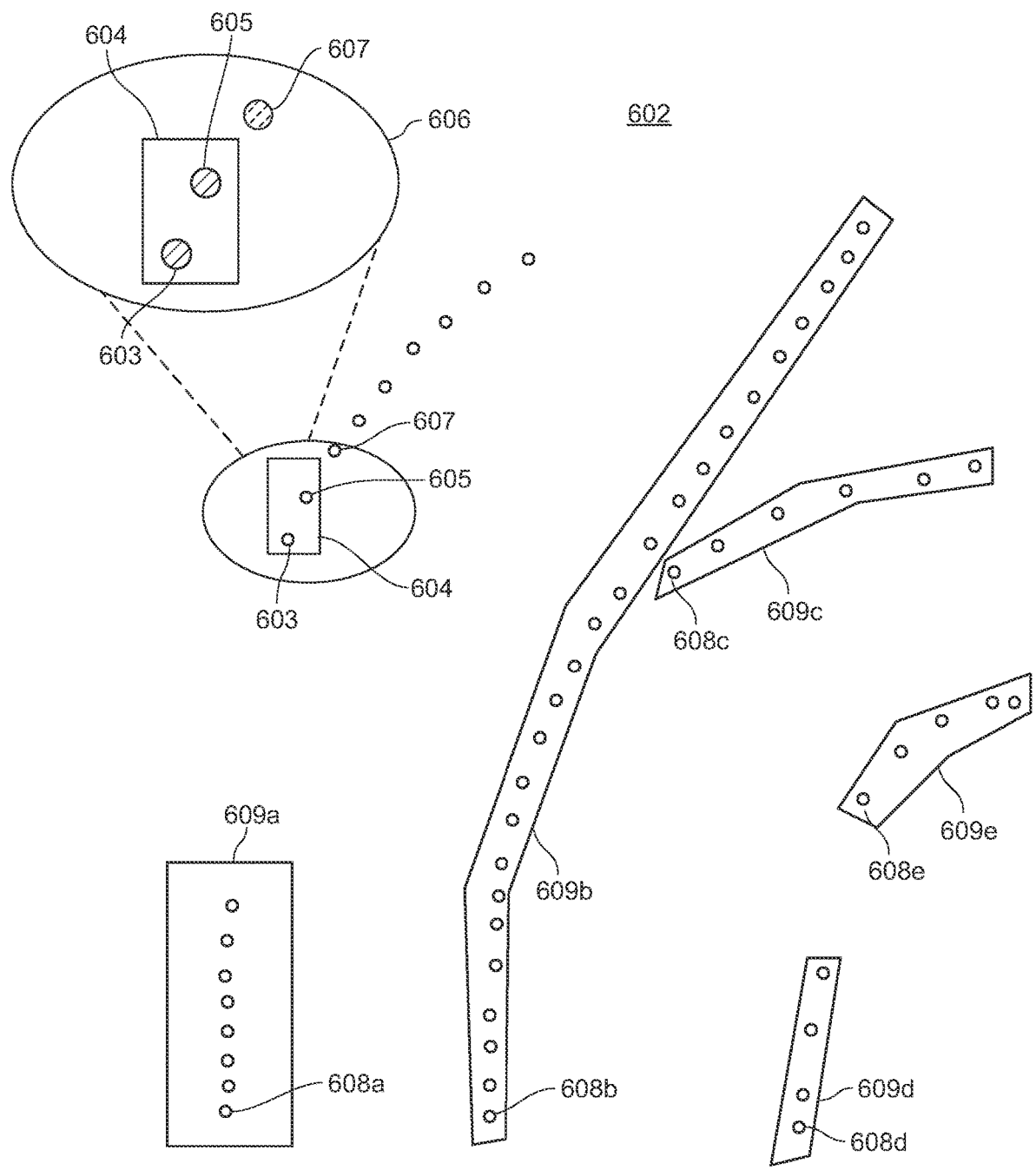
FIG. 6B illustrates an example linking technique to join the points of the example point cloud of FIG. 6A.

The lane marking detection module 104 of FIG. 1 may link lane marking pixels in accordance with the example linking technique 602 illustrated in FIG. 6B. Generally speaking, the example linking technique 602 involves choosing a starting pixel, searching for a nearest pixel to the starting pixel, and linking those two pixels. This example linking technique 602 may continue until all pixels included in the point cloud (e.g., point cloud 600) are linked. Consequently, this example linking technique 602 will provide a rough estimation for lane marking positions that the lane detection module 104 may refine at a later stage.

More specifically, the lane detection module 104 may begin the example linking technique 602 by selecting a starting pixel 603 and constructing a bounding box 604 around the starting pixel 603. While the starting pixel 603 illustrated in FIG. 6B is not the most proximate pixel to the vehicle, it is to be understood that the lane detection module 104 may prioritize pixels proximate to the vehicle to be the starting pixel. Moreover, the lane detection module 104 may construct the bounding box 604 at any point around the starting pixel 603, and at any suitable size.

In embodiments, the lane detection module 104 may construct the bounding box 604 such that the bounding box 604 is biased in one direction. For example, the lane detection module 104 may construct the bounding box 604 such that the bounding box 604 includes the starting pixel 603 at one end and the other end extends away from the vehicle in the direction of movement of the vehicle (e.g., a "forward bias"). Using a forward bias, the lane detection module 104 may more easily link pixels located ahead of the vehicle, and thus may efficiently link pixels together in the vehicle's direction of travel. Although the bounding box 604 is illustrated in FIG. 6B as a rectangle, it is to be understood that the bounding box 604 may be constructed as a circle, oval, polygon, or any other suitable shape.

After constructing the bounding box 604, the lane detection module 104 may search the area enclosed by the bounding box 604 for proximate pixels. The lane detection module 104 may locate a nearby pixel 605 within the bounding box 604, and measure the distance between the nearby pixel 605 and the starting pixel 603. In embodiments, the bounding box 604 may enclose the starting pixel 603 and multiple other pixels. In these embodiments, the lane detection module 104 may locate each of the multiple other pixels, measure the respective distances between the starting pixel 603 and each of the multiple other pixels, and determine the respective pixel of the multiple other pixels with the smallest respective distance from the starting pixel. The lane detection module 104 may then link the respective pixel with the smallest respective distance from the starting pixel to the starting pixel. However, as shown in display bubble 606, in the event where the lane detection module 104 detects only a single pixel (e.g., nearby pixel 605) within the bounding box 604, the module 104 may automatically link the starting pixel 603 with the nearby pixel 605.

Once linked, the lane detection module 104 may thereafter reference the starting pixel 603 and the nearby pixel 605 as a linked group. For example, as illustrated in FIG. 6B, the lane detection module 104 may identify the linked group (603, 605) by a similar pattern that other pixels, e.g., pixel 607, do not share. It is to be understood that linked pixel groups may be identified by similar tags, colors, and/or any other suitable indication such that the lane detection module 104 may accurately identify pixels that have been linked together.

The lane detection module 104 may then proceed with the example linking technique 602, by, for example, constructing a bounding box around the nearby pixel 605 to search for other nearby pixels (e.g., pixel 607). The lane detection module 104 may iteratively perform the example linking technique 602 until the lane detection module 104 constructs a bounding box around a pixel, and no other pixels appear within the bounding box. Thus, the lane detection module 104 may choose each of the starting pixels 608*a*-608*e* and iteratively link pixels to the starting pixels 608*a*-608*e*, consistent with the example linking technique 602 described above, to create each of the linked sections 609*a*-609*e*.

Figure 6C:
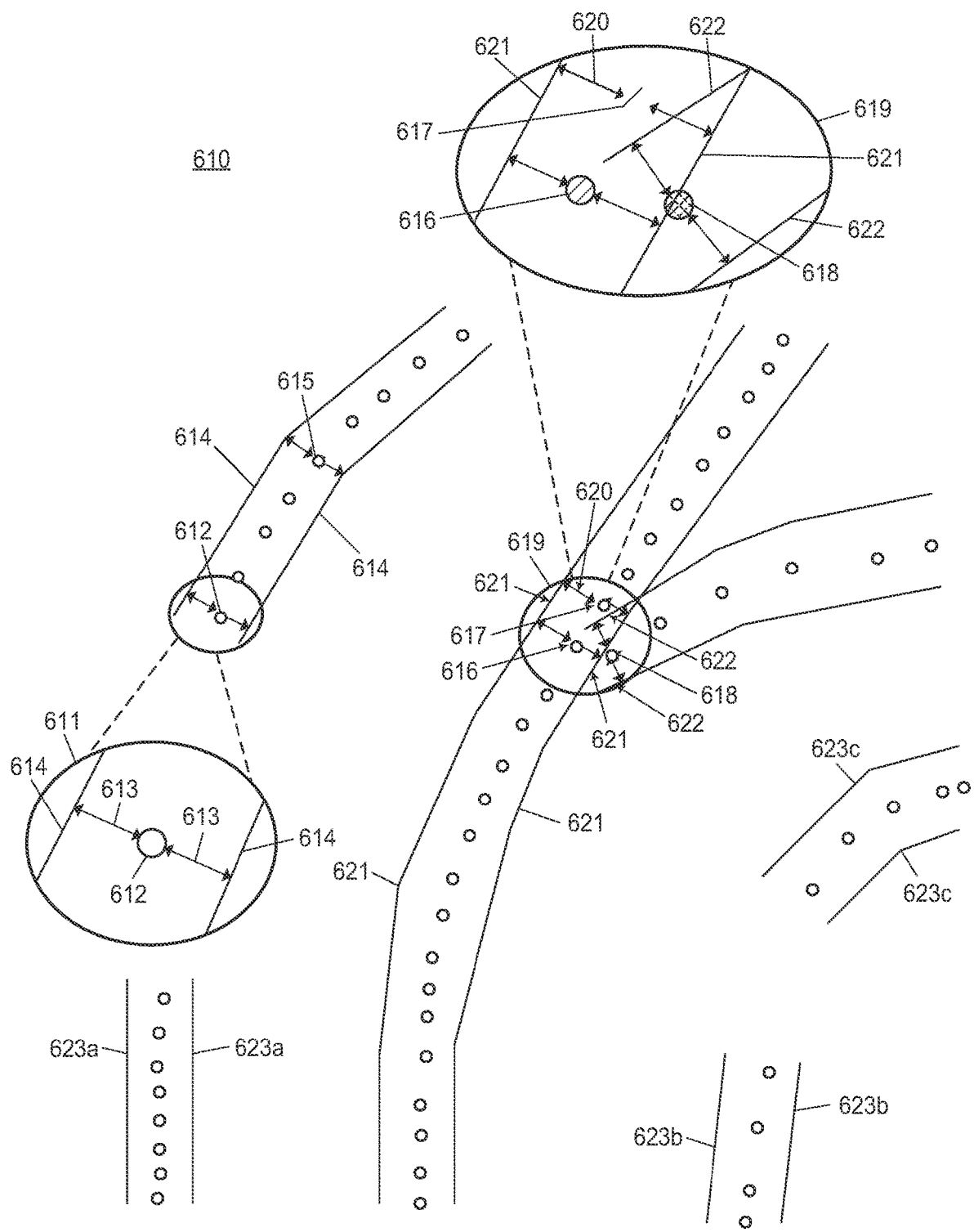
FIG. 6C illustrates another example linking technique to join the points of the example point cloud of FIG. 6A.

Alternatively, the lane detection module 104 may link pixels from the point cloud (e.g., point cloud 600) together based on the example linking technique 610 illustrated in FIG. 6C. Generally, the example linking technique 610 involves the lane detection module 104 linking the pixels of the point cloud based on bounding areas surrounding each of the pixels. As shown in the example bubble 611, the lane detection module 104 may receive a pixel 612 with associated distances 613 defining a bounding area 614. The bounding area 614 may represent the predicted locations of the lane marking boundaries. For example, the pixel 612 may represent a point within a lane marking (e.g., a paint stripe), such that the lane marking boundaries extend beyond the boundaries of the individual pixel 612. Thus, the lane detection module 104 may search within the area defining the predicted locations of the lane marking boundaries for nearby pixels. Should a pixel fall outside the bounding area 614, the lane detection module 104 may conclude that the pixel is not associated with the particular lane marking corresponding to the pixel 612.

As illustrated in the example bubble 611, the lane detection module 104 may not locate any nearby pixels within the initially defined bounding area 614. However, lane markings are typically larger than the area identified by a single pixel, so the lane detection module 104 may extend the bounding area 614 in an attempt to search for more pixels corresponding to the lane marking of the pixel 612. For example, the lane detection module 104 may extend the bounding area 614 by applying a region growth algorithm to the bounding area 614.

Once extended, the lane detection module 104 may analyze the bounding area 614 to search for pixels that do not cross either boundary of the bounding area 614. In the event that the lane detection module 104 locates a pixel within the bounding area 614 that does not cross either boundary, the lane detection module 104 may link the two pixels. As an example, the lane detection module 104 may extend the bounding area 614 of pixel 612 and iteratively link pixels located within the boundaries of the bounding area 614. After linking several pixels (3 illustrated), the lane detection module 104 may extend the bounding area 614 and reach pixel 615. Because the pixel 615 does not cross either boundary of the bounding area 614, the lane detection module 104 may link the pixel 615 to the chain of pixels linked to pixel 612.

However, as mentioned, the example linking technique 610 may result in the lane detection module 104 excluding pixels from being joined based on the bounding areas. To illustrate, when the lane detection module 104 reaches pixel 616 and extends the bounding area 621, the lane detection module 104 may analyze the region encompassed by the bounding area 621 and locate pixels 617 and 618. As shown in example bubble 619, it is clear that pixel 617 falls within the bounding area 621, while pixel 618 crosses one boundary of the bounding area 621. Thus, when the lane detection module 104 analyzes the pixels (617, 618), the lane detection module 104 may link pixel 617 with pixel 616 (indicated by similar patterning), and dissociate pixel 618 from pixel 616 (indicated by different patterning). As mentioned above, it is to be understood that linked pixel groups may be identified by similar tags, colors, and/or any other suitable indication such that the lane detection module 104 may accurately identify pixels that have been linked together.

After linking pixel 617 with pixel 616, the lane detection module 104 may apply the region growth algorithm to the bounding area 620 associated with pixel 617, and similarly apply the region growth algorithm to the distinct bounding area 622 associated with pixel 618 to create a separate linked pixel group from the one containing pixels 617 and 616. In this manner, the lane detection module 104 may iteratively detect and link pixels based on predicted bounding areas. Thus, the lane detection module 104 may similarly link the pixels associated with bounding areas 623a-623c.

Additionally or alternatively, the lane detection module 104 may link pixels from the point cloud (e.g., point cloud 600) together based on the example linking technique 624 illustrated in FIG. 6D. Generally, the example linking technique 624 involves predicting connection directions between adjacent pixels, and linking pixels located in the predicted connection directions. In embodiments, the predicted connection direction for a pixel may be a predetermined quality of the pixel based on, for example, the prior connection directions of other pixels included in the linked section of pixels associated with the pixel. Alternatively, the predicted connection directions may be an assigned quality of the pixel based on a machine learning model used by the lane detection module 104.

For example, as illustrated in the example bubble 625, the lane detection module 104 may attempt to link pixel 626 to another pixel 627. Pixel 626 may be associated with a linked section of pixels 628, and may have a predicted connection direction (as represented by the patterning of pixel 626). The predicted connection direction for pixel 626 may indicate that the pixel 626 is likely to be connected to a pixel located directly ahead of the pixel 626. In accordance with the predicted connection direction associated with pixel 626, the lane detection module 104 may construct a bounding box 629 around pixel 626 that is forward biased to search for a nearby connecting pixel. As shown, the bounding box 629 may include the pixel 627, and the lane detection module 104 may decide to link the two pixels (626, 627).

Afterwards, the lane detection module 104 may include the pixel 627 into the linked section of pixels 628, and attempt to find nearby pixels for pixel 627. However, pixel 627 may not include a predicted connection direction (as represented by the lack of patterning in pixel 627). As mentioned, each pixel may either include a predicted connection direction when received by the lane detection module 104, or the lane detection module 104 may generate one for reach pixel based on a machine learning model. Thus, in embodiments, the lane detection module 104 may determine, based on the machine learning model, that the pixel 627 does not have a predicted connection direction because there are no pixels within a proximate radius of the pixel 627. Moreover, in these embodiments, the lane detection module 104 may determine that the pixel 627 does not have a predicted connection direction because all pixels within a proximate radius of the pixel 627 are not in a similar enough direction from the pixel 627 as the rest of the linked section of pixels 628. For example, the lane detection module 104 may detect that there is a proximate pixel directly to the right of the pixel 627. However, because all of the pixels in the linked section of pixels 628 are linked in a substantially linear fashion, the lane detection module 104 may determine that the proximate pixel directly to the right of the pixel 627 should not be linked to the linked section of pixels 628 because it would represent too harsh of a change in the direction of the lane marking.

As another example, as illustrated in the example bubble 630, the lane detection module 104 may attempt to link pixel 631 with another pixel 632. Pixel 631 may be associated with a linked section of pixels 633, and may have a predicted connection direction (as represented by the patterning of pixel 631). The predicted connection direction for pixel 631 may indicate that the pixel 631 is likely to be connected to a pixel located ahead and to the right of the pixel 631. In accordance with the predicted connection direction associated with pixel 631, the lane detection module 104 may construct a bounding box 634 around pixel 631 that is biased ahead and to the right to search for a nearby connecting pixel. As shown, the bounding box 634 may include the pixel 632, and the lane detection module 104 may decide to link the two pixels (631, 632).

Afterwards, the lane detection module 104 may include the pixel 632 into the linked section of pixels 633, and attempt to find nearby pixels for pixel 632. In embodiments, the lane detection module 104 may determine, based on the machine learning model, that the pixel 632 has a predicted connection direction ahead and to the right, similar to the pixel 631 and the other pixels in the linked section of pixels 633. The lane detection module 104 may then iteratively link pixels to the linked section of pixels 633 based on the predicted connection directions and pixels included in the resulting bounding boxes. In any event, the lane detection module 104 may similarly join pixels from the point cloud (e.g., point cloud 600) to generate linked sections of pixels 634a-634d.

Figure 6E:
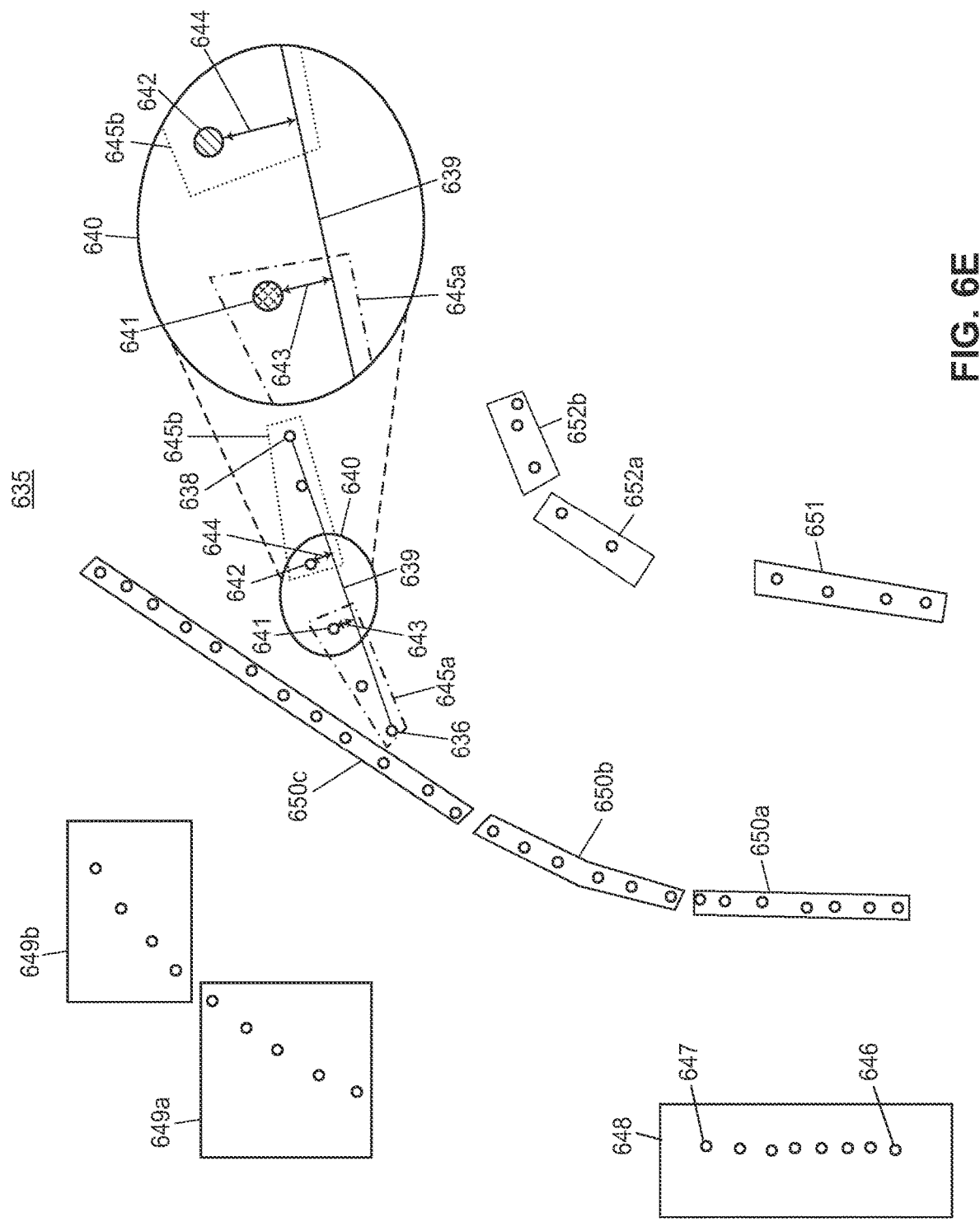
FIG. 6E illustrates an example subdivision technique to separate the joined sections of points from FIGS. 6B-D into subsections.

Regardless of the linking technique implemented (e.g., example linking techniques 602, 610, and 624), the lane detection module 104 may subsequently subdivide the linked sections into subsections. Subdividing may provide more linear subsections, such that subsequent processing tasks require less processing time and power. Thus, the lane detection module 104 may perform the example subdivision technique 636 illustrated in FIG. 6E. As illustrated in FIG. 6E, the lane detection module 104 may begin the example subdivision technique 636 by identifying a beginning pixel 637 and an ending pixel 638 of a linked section of pixels (e.g., linked section of pixels 634d in FIG. 6D). The lane detection module 104 may then construct a test line 639 between the beginning pixel 637 and ending pixel 638, and measure the distance of each pixel in the linked section of pixels from the test line 639.

For example, as shown in example bubble 640, the lane detection module 104 may analyze the first pixel 641 and the second pixel 642 with reference to the test line 639 by measuring their respective distances (643, 644) from the test line 639. The lane detection module 104 may compare the measured distances (643, 644) to a threshold distance, and the threshold distance may be predetermined or dynamically determined as part of a machine learning model. If the lane detection module 104 determines that the distance 643 associated with the first pixel 641 is less than the threshold distance, the lane detection module 104 may determine that the first pixel 641 should be linked in a subsection 645*a* with the beginning pixel 637 and any other pixels in between that satisfy the distance threshold. By contrast, if the lane detection module 104 determines that the distance 644 associated with the second pixel 642 is greater than the threshold distance, the lane detection module 104 may include the second pixel 642 in a different subsection 645*b* than the first pixel 641.

The lane detection module 104 may similarly perform the example subdivision technique 636 illustrated in example bubble 640 on all other linked sections of pixels included in the point cloud. For example, the lane detection module 104 may evaluate the linked section of pixels with beginning pixel 646 and ending pixel 647. In this circumstance, the lane detection module 104 may determine that all pixels between the beginning pixel 646 and ending pixel 647 are substantially linear, such that the grouping of all pixels between the beginning pixel 646 and ending pixel 647 will be grouped together into a subsection 648. Similarly, the lane detection module 104 may evaluate and designate subsections 649*a*, 649*b*, 650*a*-650*c*, 651, 652*a*, and 652*b*.

Figure 6F:
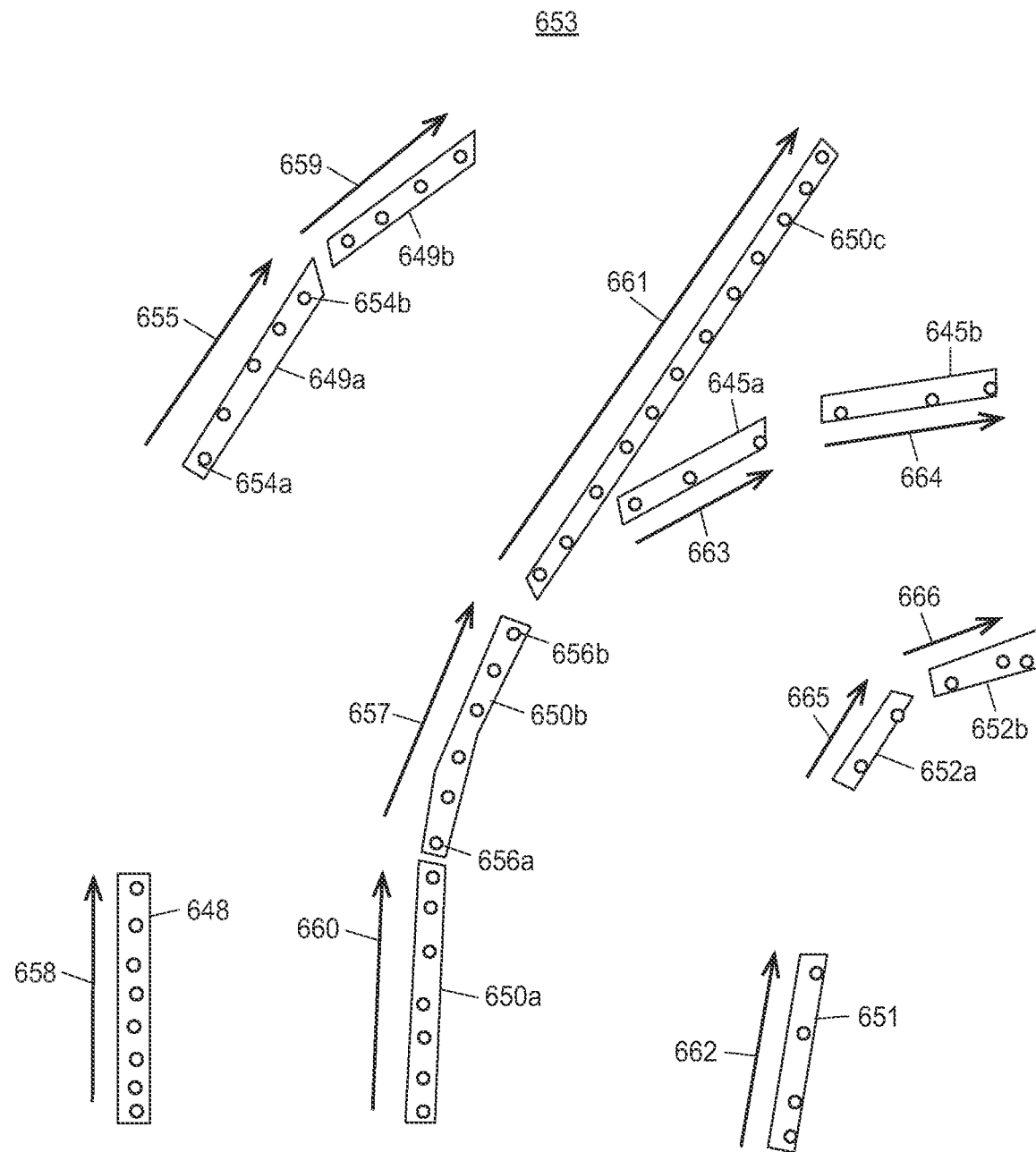
FIG. 6F illustrates an example technique to determine a principal component for each of the subsections of FIG. 6E.

After designating subsections, the lane detection module 104 may determine a principal component for each subsection, as illustrated in FIG. 6F. The principal component for each subsection may be a line or any other higher-order curve. The lane detection module 104 may fit the principal component between the ending pixels of the subsection, in accordance with the principal component fitting technique 653. For example, the lane detection module 104 may analyze the beginning pixel 654*a* and ending pixel 654*b* of subsection 649*a* to determine the principal component 655. Alternatively, the lane detection module 104 may analyze all the pixels of a subsection to determine a principal component for the subsection (e.g., based on fitting a line or curve to the pixels of the subsection). As illustrated, the principal component 655 has a slope similar to a line fit between the beginning pixel 654*a* and the ending pixel 654*b*, and a direction similar to the direction of travel of the vehicle.

Moreover, even for less linear subsections, the lane detection module 104 may determine a principal component. As an example, the lane detection module 104 may fit a line between the beginning pixel 656*a* and the ending pixel 656*b* of subsection 650*b* to determine the principal component 657. Thus, for all remaining subsections (645*a*, 645*b*, 648, 649*b*, 650*a*, 650*c*, 651, 652*a*, and 652*b*), the lane detection module 104 may determine a principal component (658-666). Importantly, the lane detection module 104 may store each of the beginning pixels (e.g., 654*a*, 656*a*) and ending pixels (e.g., 654*b*, 656*b*) (referenced further herein as "control points") used to generate the principal components in memory for later use, as described further herein. Alternatively, the lane detection module 104 may designate the beginning and ending points of each principal component as control points. In any event, the lane detection module 104 may utilize the principal components for each subsection to link the subsections together.

Figure 6G:
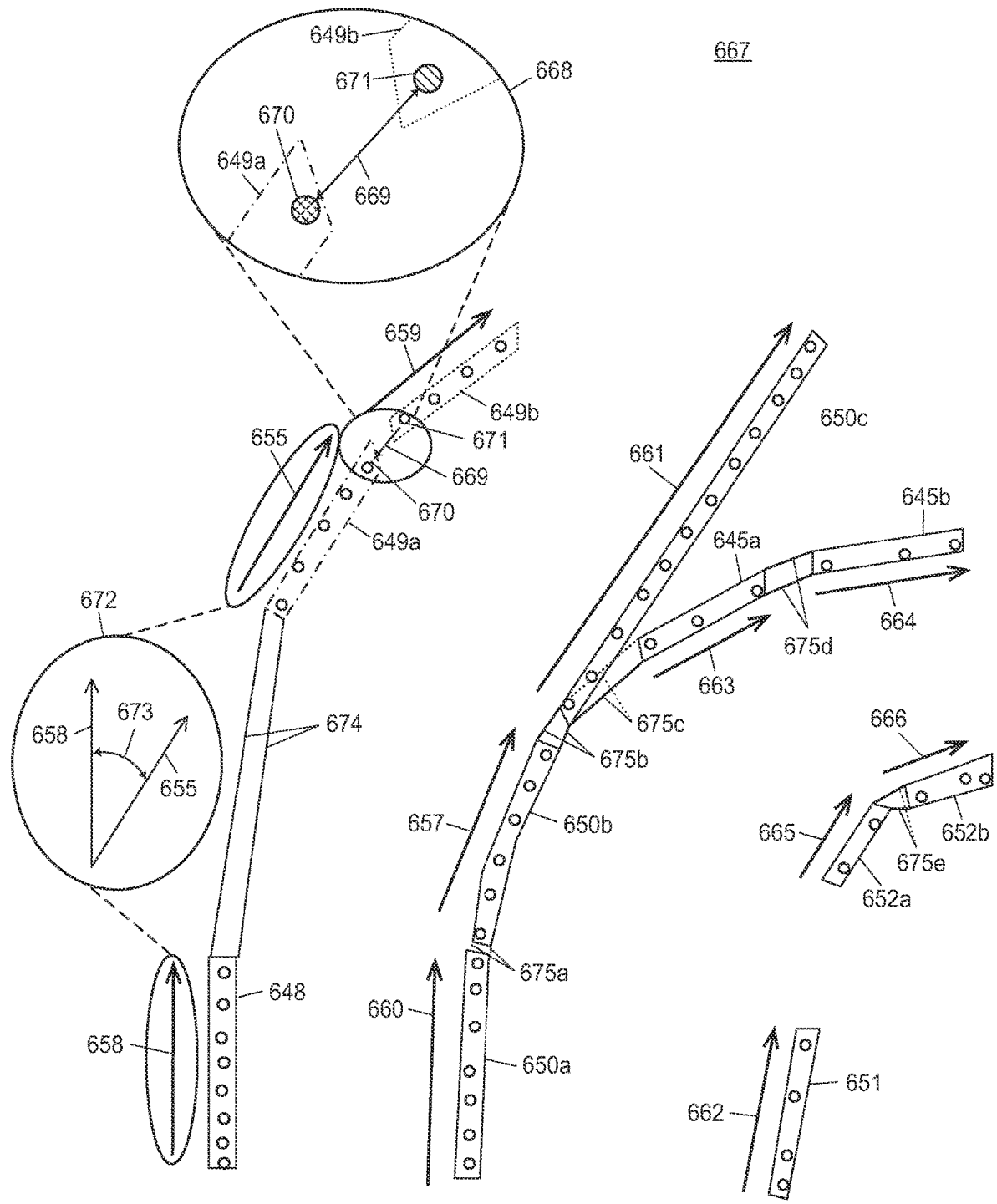
FIG. 6G illustrates an example association technique to join the subsections of FIG. 6E together based on the principal components of FIG. 6F.

The lane detection module 104 may proceed to link subsections together (referenced herein as "associating subsections") in accordance with the subsection association technique 667 illustrated in FIG. 6G. Generally speaking, the subsection association technique 667 involves the lane detection module 104 comparing distances and angular differences between neighboring control points of subsections. As shown in the example bubble 668, the lane detection module 104 may first determine a distance 669 between control points (670, 671) of two subsections (649*a*, 649*b*). The lane detection module 104 may then compare the distance 669 to a threshold distance to determine whether the corresponding subsections (649*a*, 649*b*) should be linked.

In embodiments, the distance threshold may include a lower distance threshold and an upper distance threshold. In these embodiments, if the distance 669 is below the lower distance threshold, the lane detection module 104 will automatically join the two subsections (649*a*, 649*b*). By contrast, if the distance 669 is above the upper distance threshold, the lane detection module 104 will automatically not join the two subsections (649*a*, 649*b*). However, if the lane detection module 104 determines that the distance 669 is above the lower distance threshold and below the upper distance threshold, the lane detection module 104 may analyze the control points (670, 671) with respect to an angular threshold.

An example of an angular threshold analysis performed by the lane detection module 104 is displayed in example bubble 672. When analyzing two control points of subsections (648, 649*a*), the lane detection module 104 may determine that the distance 673 separating the control points is above the lower distance threshold and below the upper distance threshold. Consequently, the lane detection module 104 may compare the angular separation 674 between the line representing the distance 673 between the control points and the principal component (655, 658) of each subsection (648, 649*a*). If the angular separation 674 between the line representing the distance 673 between the control points and each of the principal components (655, 658) is less than the angular threshold, then the lane detection module 104 may automatically join the subsections (648, 649*a*).

As another example, the lane detection module 104 may attempt to join subsections 648 and 650*b*. The distance between either set of control points may be above the lower distance threshold and below the upper distance threshold, such that the lane detection module 104 may conduct an angular threshold analysis between the two subsections (648, 650*b*). However, a line drawn from an upper control point of subsection 648 to a lower control point of subsection 650*b* would be substantially perpendicular to the direction of the principal components (658, 657) of both subsections (648, 650*b*). Thus, once the lane detection module 104 compares the angular separation of both principal components (658, 657) to the line drawn between the control points of the two subsections (648, 650*b*), the lane detection module 104 would determine that the angular separation exceeds the angular threshold. By determining that the line drawn between the two subsections (648, 650*b*) exceeds the angular threshold, the lane detection module 104 would automatically not join the subsections (648, 650*b*). In this manner, the lane detection module 104 may avoid joining subsections that would represent a lane marking that is unrealistically angular or "sharp" for a roadway, or that would otherwise cause an autonomous vehicle to perform unsafe control operations to maneuver within the lane markings.

The lane detection module 104 may similarly evaluate the control points of each subsection to determine appropriate associations between subsections. Thus, as illustrated, the lane detection module 104 may join subsections 648, 649a, and 649b; subsections 650a, 650b, and 650c via association lines 675a and 675b; subsections 650c, 645a, and 645b via association lines 675c and 675d; and subsections 651, 652a, and 652b via association lines 675e and 675f. Moreover, as indicated by the association of subsection 650c to subsection 650b and subsection 645a, the lane detection module 104 may associate one subsection with multiple other subsections and one control point with multiple other control points.

Figure 6H:
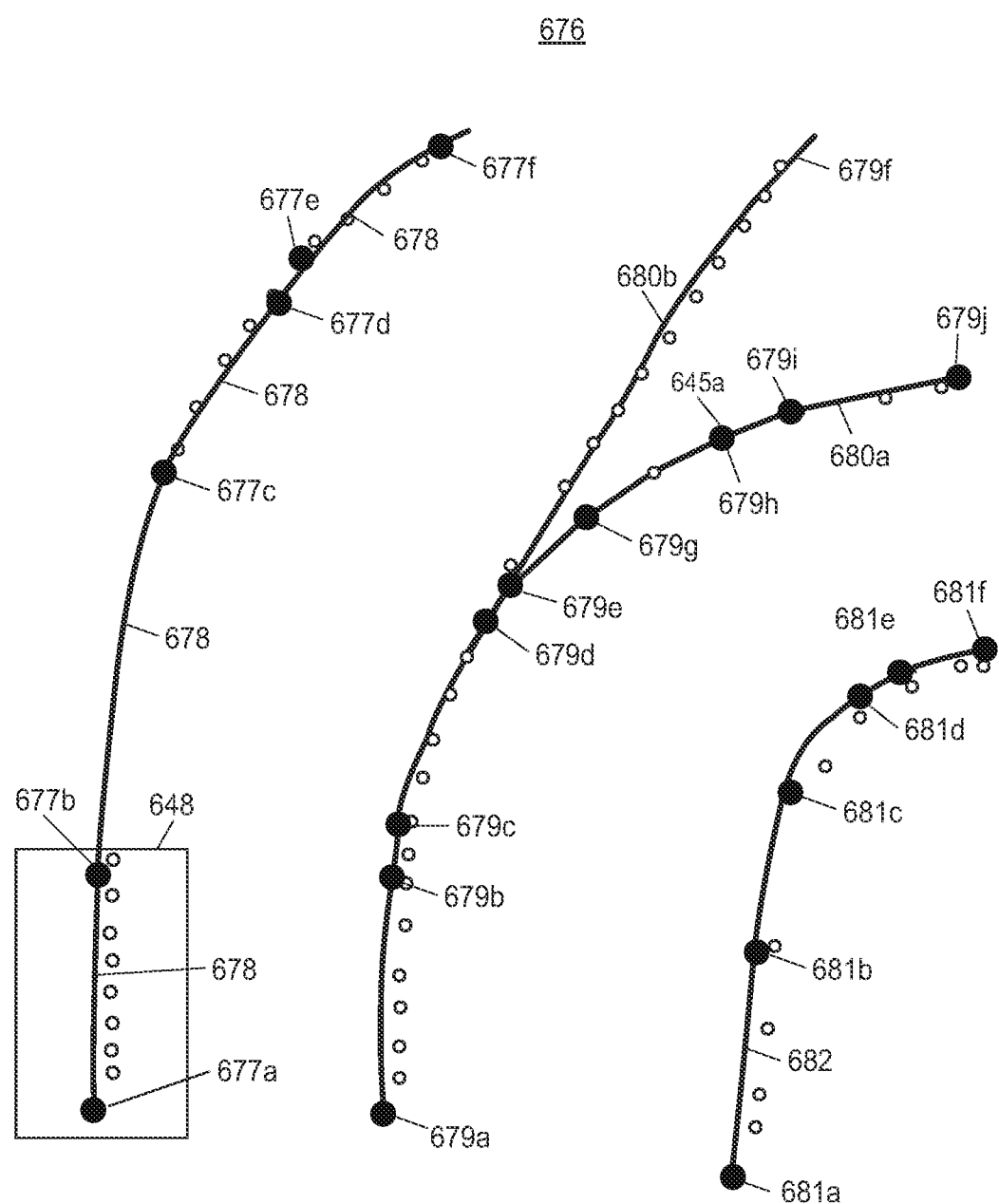
FIG. 6H illustrates an example splining technique to fit a curve to the joined subsections of FIG. 6G corresponding to lane markings on a roadway.

Finally, the lane detection module 104 may fit a spline through the control points of linked subsections. As illustrated in FIG. 6H, the lane detection module 104 may analyze the control points 677a-677f to fit a spline 678 representative of the lane markings indicated by the linked subsections (e.g., subsection 648). Similarly, the lane detection module 104 may analyze the control points 679a-679e, 679e-679f, 679e-679j, and 681a-681f to fit the splines 680a-680c and 682, respectively. Generally, the lane detection module 104 may use any suitable splining method to generate the spline, and in embodiments, the lane detection module 104 may use a Catmull-Rom spline method to generate the spline through the control points.

Using only the control points 677a-677f to fit a spline drastically reduces the number of points conventionally used to generate a spline, and thus drastically reduces the processing demands on the system to generate the resulting spline 678. Consequently, by using only the control points of each subsection (rather than using the pixels of each subsection), the example splining technique 676 illustrated in FIG. 6H achieves a technological improvement over conventional lane identification techniques by reducing the time and processing power necessary to fit a spline representative of lane markings.

In other embodiments, the lane detection module 104 may perform the subsection association and splining through a graph theory technique. The lane detection module 104 may begin by constructing a graph using the control points of each subsection. As an example, the lane detection module 104 may utilize the control points as nodes and may construct lines between each node to generate the graph. The lines connecting each node may constitute the edges of the graph, and the graph may be a "clique" or "complete graph," meaning every node is connected to every other node by an edge. Moreover, the lane detection module 104 may form each edge by fitting a spline between each pair of nodes. The lane detection module 104 may use any suitable spline, such as a cubic spiral in which the curvature K as a function of distance s along the spiral is expressed as $$K(s)=a_0+a_1s+a_2s^2+a_3s^3.$$

After the lane detection module 104 generates the graph, the lane detection module 104 may determine a cost for each edge in the graph. The lane detection module 104 may determine the cost based on several constraints. For example, a first constraint may be to penalize edges that cross a barrier, such that these edges have a high associated cost. During classification, when pixels associated with lanes are identified, barriers are also identified. Barriers correspond to sections at the edge/border of a roadway or the region between roads going in different directions. Thus, the lane detection module 104 may apply a high cost to any edge that crosses a barrier.

A second constraint may be to incentivize edges that go through lane markings. Generally speaking, an edge that follows an identified lane marking or is otherwise substantially parallel to an identified lane marking represents a low cost because it indicates a connection between lane markings that exists in reality. Correspondingly, the lane detection module 104 may give edges that follow identified lane markings a low cost.

A third constraint may be to evaluate the drivability associated with every edge. The lane detection module 104 may apply a cost to edges based on the sharpness, curvature, etc. of the edge, taking into consideration the type of roadway. For a freeway, a high cost is applied to sharp edges (e.g., a rapid lateral change has a high cost). By contrast, for an urban environment, sharp edges have relatively low cost due to the lower speed of travel resulting in an increased ability for vehicles to reasonably perform such a rapid lateral change. Thus, the lane detection module 104 may apply a higher or lower cost assessment for each edge based on the driving environment.

Once the lane detection module 104 has established the graph and applied all costs to the graph nodes, the lane detection module 104 may determine the lowest-cost paths across the graph. The lane detection module 104 may designate a source node and a target node in the graph, such that the lane detection module 104 will traverse the graph from the source node to the target node. The lane detection module 104 may then identify the region of interest for the vehicle (e.g., +/−100 m from the vehicle's current position), and establish a source node at 100 m behind the vehicle and a target node at +100 m ahead of the vehicle. Establishing the source node behind the vehicle may yield a heightened predictive capability by ensuring consistency in the linked lane markings.

Finally, the lane detection module 104 may apply graph theory to find the lowest-cost paths that traverse the graph through the various nodes. For example, the graph may be represented as a matrix where rows and columns correspond to the nodes, and each cell of the matrix is a corresponding cost. Moreover, the lane detection module 104 may apply a constraint to the graph to account for lane splits and merges so that every node has a maximum of two incoming or two outgoing edges. The lane detection module 104 may utilize any standard graph-traversal technique to find the lowest-cost path (e.g., Dijkstra's algorithm). Following application of a suitable graph-traversal technique, the lane detection module 104 may generate a set of the lowest-cost paths that correspond to the lane markings of the roadway. Thus, the lowest-cost paths may represent a set of low-cost paths that traverse the graph while simultaneously covering each node included in the graph. Each of the low-cost paths may include one or more pairs of nodes, and each pair of nodes may be joined together by a spline. The splines between pairs of nodes of a low-cost path may be joined together to form a representation of a lane.

Regardless of the applied spline technique, once the lane detection module 104 determines one or more splines to fit the point cloud (e.g., point cloud 600), the lane detection module 104 may include the point cloud and the associated splines in the perception signals 103. As previously mentioned in reference to FIG. 1, the perception signals may be sent to the vehicle control component 107 and the lane tracking and prediction module 105. Thus, the lane tracking and prediction module 105 may receive the one or more splines for use in tracking and predicting the location of roadway lanes as the vehicle travels forward along a roadway.

Figure 7A:
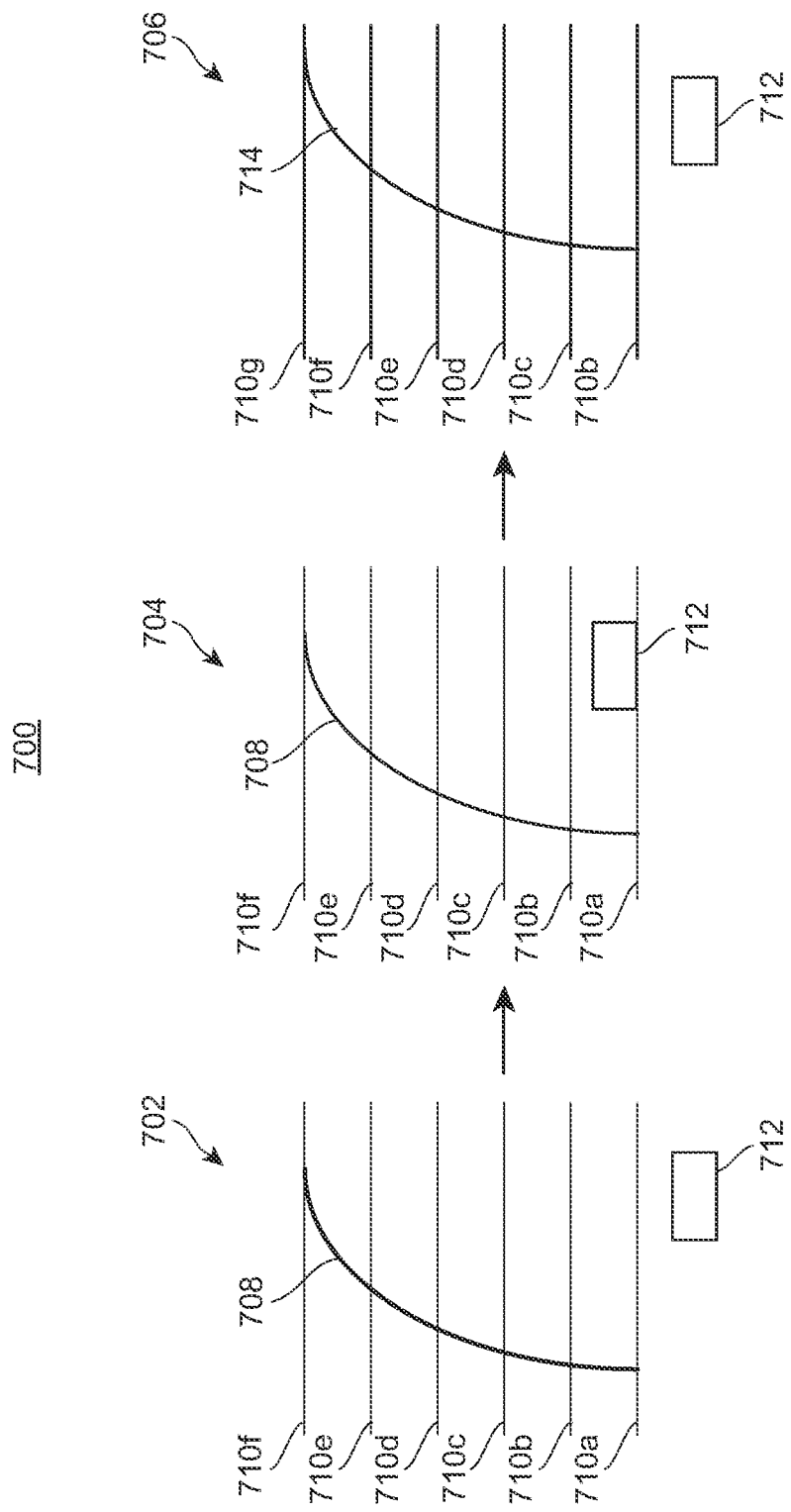
FIG. 7A illustrates an example lane marking extension technique based on the movement of the vehicle, prior lane marking detections, and prior lane marking predictions.

Accordingly, the lane tracking and prediction module 105 may perform an example lane marking extension technique 700 illustrated in FIG. 7A. Generally speaking, the example lane marking extension technique 700 involves extending a spline received from the lane detection module 104 further away from the vehicle (in the direction of travel of the vehicle) based on simulated motion of the vehicle, prior lane marking detections, and prior lane marking predictions. Extending the spline away from the vehicle and the simulated motion of the vehicle are illustrated in the series of position models 702, 704, and 706. It should be understood that all processes and operations performed in reference to FIG. 7A may take place before or without any actual movement of the vehicle.

With reference to position model 702, the lane tracking and prediction module 105 may receive data included in the perception signal 103 indicative of a fitted spline 708 representing a roadway lane marking. The lane tracking and prediction module 105 may also display and/or construct a first set of distance reference lines 710a-710f extending across at least a portion of the field-of-view of the vehicle 712 sensors (e.g., Sensor 1, Sensor 2, Sensor N, in FIG. 1) including the fitted spline 708. It is to be appreciated that the first set of distance reference lines 710a-710f may be digital constructs used by the lane tracking and prediction module 105 to represent selected distances with respect to the vehicle 712, and may not be projected or otherwise rendered in an actual environment of the vehicle (e.g., environment 380).

As illustrated in position model 704, the lane tracking and prediction module 105 may advance the position of the vehicle 712 with respect to the fitted spline 708 and the first set of distance reference lines 710a-710f. For example, the lane tracking and prediction module 105 may reposition the vehicle 712 from the location illustrated in position model 702 to just above a first distance reference line 710a. Additionally or alternatively, the lane tracking and prediction module 105 may collectively shift the fitted spline 708 and the first set of distance reference lines 710a-710f down without moving the vehicle 712. In any event, the lane tracking and prediction module 105 may proceed to extend the fitted spline 708, as illustrated in the position model 706, once the vehicle 712 has been repositioned.

The position model 706 generally represents a prediction from the lane tracking and prediction module 105 of lane marking locations a distance beyond the range of the vehicle 712 sensors. The position model 706 includes the vehicle 712, a second set of distance reference lines 710b-710g, and an extended spline 714. For simplicity, the second set of distance reference lines 710b-710g includes several distance reference lines (e.g., 710b-710f) from the first set of distance reference lines 710a-710f. However, at least one of the second set of distance lines 710b-710g (e.g., 710g) may represent a distance out-of-range of the vehicle 712 sensors at the time the lane tracking and prediction module 105 generates the position model 706. Thus, it should be understood that the second set of distance reference lines 710b-710g may include some or none of the distance reference lines from the first set of distance reference lines 710a-710g.

Thus, the lane tracking and prediction module 105 may be configured to predict the location of lane markings beyond the range of the vehicle 712 sensors based on previous lane marking detections and previous predictions of lane marking locations. For example, the lane tracking and prediction module 105 may analyze the forward motion of the vehicle 712 and the fitted spline 708 to recognize that the lane markings are curving to the right with respect to the vehicle 712. Based on prior lane marking location predictions, the lane tracking and prediction module 105 may interpret such curvature to indicate that any future detected lane markings may be located further to the right with respect to the position of the vehicle 712.

Moreover, in embodiments, the lane tracking and prediction module 105 may recognize the fitted spline 708 as similar to a prior spline. For example, the lane tracking and prediction module 105 may utilize location information (e.g., GPS coordinates) and/or a spline comparison algorithm (e.g., comparing spline curvature, spline length, mathematical formulation of the similar splines, etc.) to associate the fitted spline 708 with the prior spline. If such a prior spline is identified, the lane tracking and prediction module 105 may compare any predictions related to the fitted spline 708 (e.g., extended spline 714) to predicted spline extensions or observed lane marking locations of the prior spline. As used herein, a "prior" or "similar" spline may reference a spline generated by, for example, the lane tracking and prediction module 105 at a time prior to the example splines generated and/or extended/predicted by the spline generation techniques described above and the example spline extension techniques described herein.

Accordingly, the lane tracking and prediction module 105 may utilize the previous lane marking detections and previous predictions of lane marking locations to generate the extended spline 714. In embodiments, the extended spline 714 may include the fitted spline 708 and an extended spline portion (e.g., portion of the extended spline 714 extending between distance lines 710f-710g). Alternatively, as illustrated, the extended spline 714 may be a new, standalone spline generated by the lane tracking and prediction module 105. The lane tracking and prediction module 105 may generate the extended spline 714 as a new, standalone spline by, for example, fitting a spline between the remaining control points of the fitted spline 708 (e.g., the fitted spline 708 control points within distance lines 710b-710f) and one or more predicted control points at a distance beyond the reach of the vehicle 712 sensors. The predicted control points may represent a prediction of the lane tracking and prediction module 105 related to the likely positions of lane markings based on any of the data described above.

The lane tracking and prediction module 105 may improve the predictive techniques described above by comparing the predicted results (e.g., extended spline 714) to detected results. For example, at some time after the predictions described above, the vehicle 712 may traverse the distance represented by the gap between distance lines 710a and 710b. Objects within a distance represented by the gap between distance lines 710f and 710g may then be within range of the vehicle 712 sensors. Accordingly, perception components of the vehicle 712 (e.g., lane marking detection module 104) may receive and analyze data representing these objects to generate a new spline corresponding to the detected lane markings on the roadway.

Generally speaking, comparing the predicted results to the detected results involves quantizing both sets of results in a manner that most closely represents the respective data sets. This can prove challenging because the detected results may be pixels representing lane markings in a physical environment of the vehicle (e.g., pixel 601), while the predicted results may be data inferred from heuristic principles and prior observations, in accordance with the prediction techniques described above. Thus, the lane tracking and prediction module 105 may utilize statistical interpretations of the predicted results and the detected results to achieve a workable mathematical formulation.

Figure 7B:
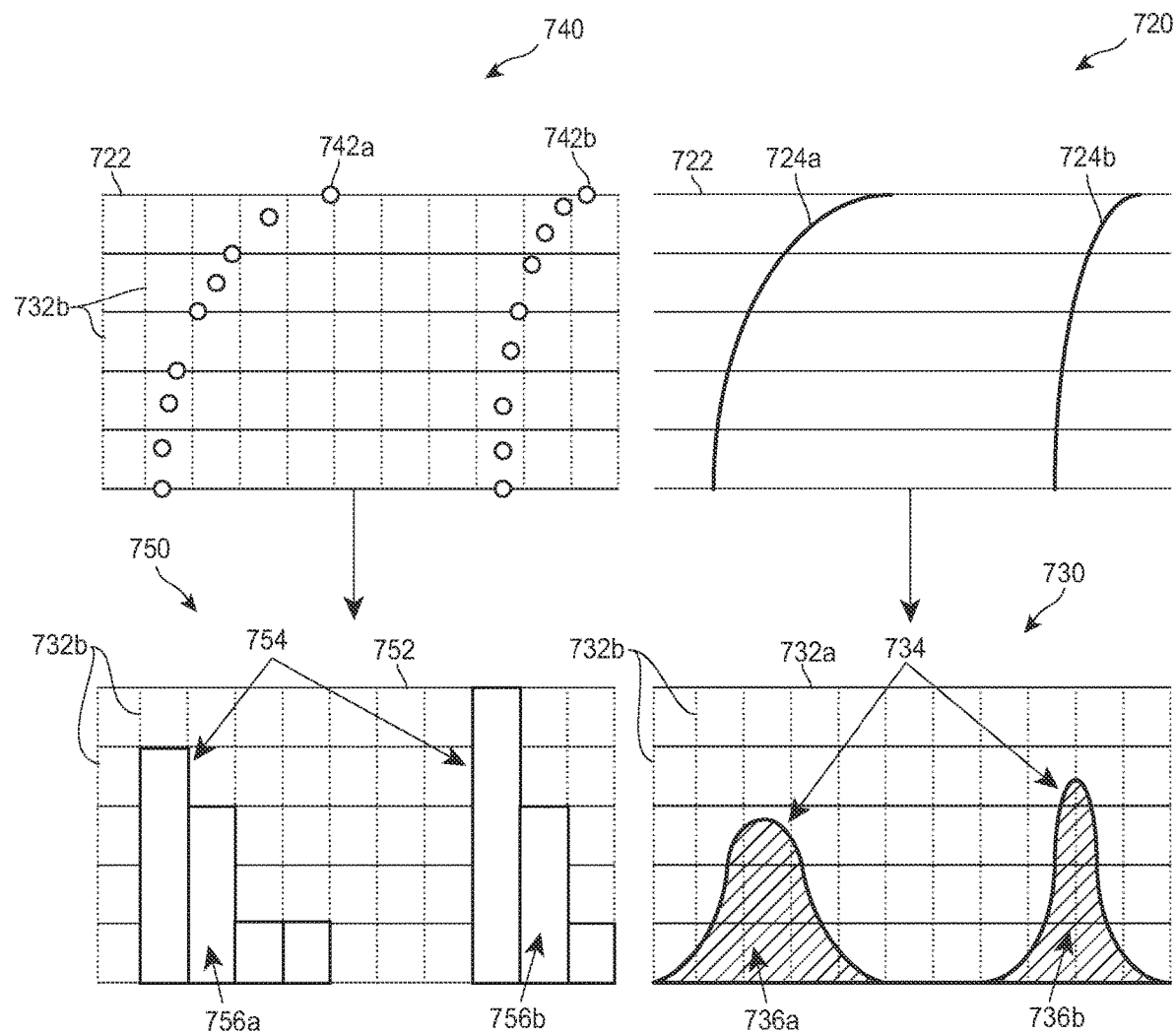
FIG. 7B illustrates an example likelihood evaluation technique to determine how well the extended spline from FIG. 7A fits the actual lane markings.

For example, and in reference to FIG. 7B, the lane tracking and prediction module 105 may generate a predicted lane marking position model 720. The predicted lane marking position model 720 may include a set of distance lines 722, wherein each distance line represents a distinct distance from the vehicle. The predicted lane marking position model 720 may also include a first predicted spline 724a and a second predicted spline 724b. All or some of each of the first predicted spline 724a and the second predicted spline 724b may represent the predicted locations of roadway lane markings. As mentioned above, any portion of either the first predicted spline 724a or the second predicted spline 724b that is not a predicted location of roadway lane markings may represent prior detected locations of roadway lane markings.

Importantly, the predicted portions of the first predicted spline 724a and the second predicted spline 724b may not be based on received data from the vehicle sensors. Consequently, the lane tracking and prediction module 105 may be unable to accurately represent the position of any control points used to generate the predicted portions of the splines. However, the lane tracking and prediction module 105 may generate distribution plots of the splines 724a, 724b, as illustrated in the distribution model 730.

The distribution model 730 may include a set of unit lines 732a and a set of lateral divisions 732b. The set of unit lines 732a may represent a discrete set of any suitable unit for measurement in the context of the analysis of the lane tracking and prediction module 105. For example, the set of unit lines 732a may represent a percentage area of the corresponding spline 724a, 724b contained within a respective pair of lateral divisions.

The set of lateral divisions 732b may represent a set of discrete lateral distances across the vehicle sensor horizontal field of regard. For example, as a lidar system scans the field of regard, as illustrated in FIG. 3, the perception components of the vehicle may correlate angular displacement of the lidar system with a corresponding lateral distance across the field of regard. Accordingly, the perception components of the vehicle may record the set of lateral divisions 732b, and the lane tracking and prediction module 105 may overlay the set of lateral divisions 732b over the set of unit lines 732a when creating the distribution model 730.

Both the set of unit lines 732a and the set of lateral divisions 732b may be digital constructs generated by the lane marking detection module 104 and/or the lane tracking and prediction module 105 to represent discrete distances with respect to a vehicle (e.g., vehicle 712). These constructs (732a, 732b) are used for the purposes of illustration only, and may not be projected or otherwise rendered in an actual environment of the vehicle (e.g., environment 380).

The distribution model 730 may also include a set of distributions 734. The set of distributions 734 may include a first distribution 736a and a second distribution 736b. The first distribution 736a may correspond to the first predicted spline 724a, and the second distribution 736b may correspond to the second predicted spline 724b. Although illustrated in FIG. 7B as including two distributions (e.g., 736a, 736b), it is to be appreciated that the lane tracking and prediction module 105 may generate any number of predicted splines and corresponding distributions. In embodiments, each distribution in the set of distributions 734 may be a Gaussian kernel. Moreover, in embodiments, each distribution in the set of distributions 734 may be normalized such that each distribution encloses an identical area.

In this context, the first distribution 736a may be said to "correspond" to the first predicted spline 724a because each percentage of the area bound by the first distribution 736a within each respective pair of lateral divisions may be identical to each percentage of the first predicted spline 724a bound by the each respective pair of lateral divisions. For example, the second distribution 736b may have a large peak portion centralized primarily within one pair of lateral divisions because the second predicted spline 724b similarly includes a large portion of the spline within the pair of lateral divisions. As illustrated, the set of lateral divisions 732b may not be included in the predicted lane marking position model 720. Nevertheless, the lane tracking and prediction module 105 may access the data used to generate the set of lateral divisions 732b when analyzing the predicted lane marking position model 720 to generate the distribution model 730.

Correspondingly, the perception components of the vehicle may generate an updated position model 740. The updated position model 740 may include the set of distance lines 722, the set of lateral divisions 732b, a first set of lane marking indicators 742a, and a second set of lane marking indicators 742b. The first set of lane marking indicators 742a and the second set of lane marking indicators 742b may represent the locations of detected lane markings, and may have been generated by the lane marking detection module 104. As illustrated, each of the lane marking indicators included in the first set of lane marking indicators 742a and the second set of lane marking indicators 742b falls within a region of the updated position model 740, as defined by a pair of lateral divisions.

Usefully, the first set of lane marking indicators 742a and the second set of lane marking indicators 742b represent a readily quantifiable set of data. The lane tracking and prediction module 105 may utilize the set of lateral divisions 732b, similar to generating the distribution model 730, to count the number of lane marking indicators present in each region of the updated position model 740, as defined by the respective pairs of lateral divisions. After each lane marking indicator is counted, the lane tracking and prediction module 105 may generate a histogram to represent the data, as illustrated by the histogram model 750.

The histogram model 750 may include a set of unit lines 752, the set of lateral divisions 732b, and a set of histograms 754. The set of unit lines 752 may represent a number of lane marking indicators included in a respective pair of lateral divisions. The set of histograms 754 may include a first histogram 756a and a second histogram 756b. The first histogram 756a may correspond to the first set of lane marking indicators 742a, and the second distribution 754b may correspond to the second set of lane marking indicators 742b. Although illustrated in FIG. 7B as including two histograms (e.g., 756a, 756b), it is to be appreciated that the lane tracking and prediction module 105 may generate any suitable number of histograms corresponding to the number of data sets received (e.g., 742a, 742b).

In this context, the first histogram 756a may be said to "correspond" to the first set of lane marking indicators 742a because the number of lane marking indicators from the first set of lane marking indicators 742a included within a respective pair of lateral divisions may be identical to the height of an individual bar of the first histogram 756a contained within the respective pair of lateral divisions, as indicated by the set of unit lines 752. For example, the second histogram 756b may include three bars of varying heights within a pair of lateral divisions because the second set of lane marking indicators 742b similarly includes varying numbers of lane marking indicators within the pair of lateral divisions.

Following the generation of the set of distributions 734 and the set of histograms 754, the lane tracking and prediction module 105 may proceed to compare the predicted results (e.g., set of distributions 734) to the detected results (e.g., set of histograms 754). In embodiments, the lane tracking and prediction module 105 may compare the predicted results to the detected results by convolving the functional embodiments of both sets, mathematically represented as:

$$L = \sum_i G(i) * H(i), \quad (1)$$

where i represents a respective spline of the predicted results and the detected results, G(i) represents a distribution from the set of distributions 734, H(i) represents a histogram from the set of histograms 754, and L represents a likelihood score resulting from the convolution of G(i) and H(i) for all splines included in the predicted results and the detected results.

Generally speaking, the likelihood score L may represent a quality-of-fit between the predicted results and the detected results. The higher the overlap between the predicted results and the detected results, the higher the likelihood score L may be. For example, assume the lane tracking and prediction module 105 generates a set of predicted splines (e.g., first predicted spline 724a and second predicted spline 724b) that, when compared to the resulting detected results (e.g., first set of lane marking indicators 742a and second set of lane marking indicators 742b), yield a high likelihood score L. The high likelihood score L may indicate that the lane tracking and prediction module 105 generated a very close approximation of the lane marking locations, and as a result, the lane tracking and prediction module 105 may use the high likelihood score L to influence future predictions. Similarly, the lane tracking and prediction module 105 may utilize any suitable number of likelihood scores L of any quality (e.g., high likelihood scores, average/medium likelihood scores, low likelihood scores) to influence any subsequent predictions.

Figure 8:
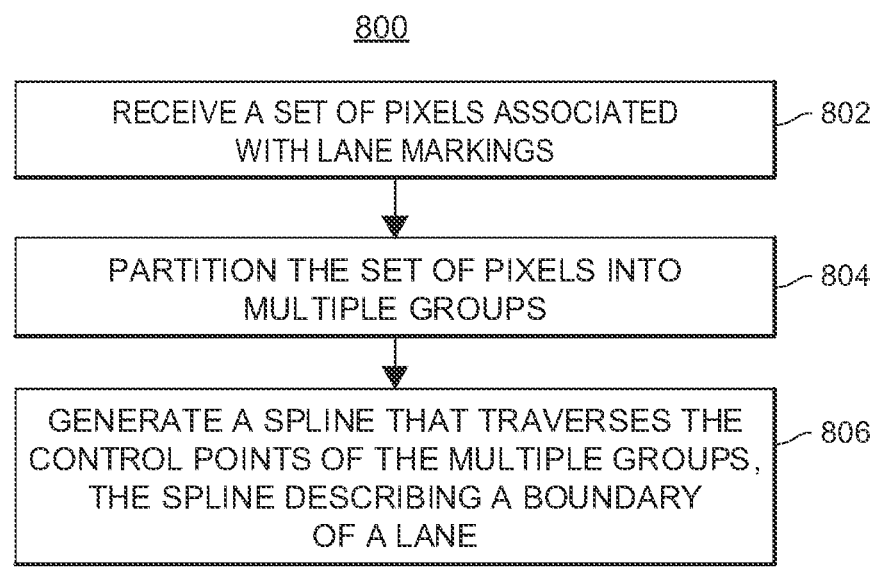
FIG. 8 is a flow diagram of a method for detecting boundaries of lanes on a road.

In order to perform the lane detection functionality described above, a computing system (e.g., lane marking detection module 104) may implement a method 800 according to a flow diagram illustrated in FIG. 8. The method 800 begins by receiving a set of pixels associated with lane markings (block 802). For example, the lane marking detection module 104 of FIG. 1 may receive a set of pixels from the one or more sensors 101. The one or more sensors 101 may automatically categorize each pixel of the set of pixels, such that the lane marking detection module 104 may recognize the pixels associated with lane markings. Additionally or alternatively, the lane marking detection module 104 may receive a set of pixels containing a variety of objects from the vehicle environment, and the lane marking detection module 104 may thereafter categorize the pixels associated with lane markings. Block 802 may be performed by, for example, the lane marking detection module 104 of FIG. 1, or any suitable processor.

At block 804, the lane marking detection module 104 or suitable processor may partition the set of pixels into multiple groups. Each of the multiple groups may be associated with one or more control points. The lane marking detection module 104, or other suitable processor, may partition the set of pixels in any suitable manner.

For example, in embodiments, the lane marking detection module 104 or suitable processor may begin partitioning the set of pixels by iteratively linking the pixels from the set of pixels into one or more linked sections of pixels (e.g., as illustrated in FIGS. 6B-6D). The lane marking detection module 104 may then determine a principal component for each linked section of the one or more linked sections of pixels (e.g., as illustrated in FIG. 6F). Each principal component may include a control point of the one or more control points. Generally, the principle component for each linked section of pixels may be a line or any other higher order curve suitable to join the points included in the linked section of pixels by the one or more control points. In embodiments, the principle component for each linked section of pixels may be bounded by the control points for each linked section of pixels.

Continuing the prior example, and in embodiments, the lane marking detection module 104 or suitable processor may define a set of control points based on the respective control points corresponding to each principal component. The lane marking detection module 104 may then execute an association algorithm to join linked sections of pixels (e.g., as illustrated in FIG. 6G). The association algorithm may include determining an endpoint distance between respective pairs of control points and an endpoint angle between the respective pairs of control points. Thus, the lane marking detection module 104 may identify pairs of control points for different linked sections of pixels to determine the distance and angles between the respective pairs of control points. The lane marking detection module 104 may then compare the endpoint angle for each respective pair of control points with a threshold endpoint angle and the endpoint distance for each respective pair of control points with a threshold endpoint distance. Responsive to determining that (i) the endpoint distance for a respective pair of control points is less than or equal to the threshold endpoint distance and (ii) the endpoint angle for a respective pair of control points is less than or equal to the threshold endpoint angle, the lane marking detection module 104 may associate (e.g., join) the linked sections of pixels via their respective control points.

As another example, the lane marking detection module 104 or suitable processor may begin partitioning the set of pixels by executing a linking algorithm. The linking algorithm may include generating a bounding box around a first pixel of the set of pixels. In embodiments, the bounding box may be rectangular, and may include a forward bias with respect to the first pixel. As mentioned above, lane marking detection module 104 may link pixels in a direction extending in the direction of travel (e.g., away) from the vehicle. Thus, the lane marking detection module 104 may generate a bounding box with a forward bias to account for the likely area-of-interest with respect to the motion of the vehicle.

To further this example, the lane marking detection module 104 may then scan an area encompassed by the bounding box to locate a second pixel. The second pixel may be located directly ahead of the first pixel (with respect to the motion of the vehicle), or the second pixel may be displaced any amount from being directly ahead of the first pixel while remaining within the bounding box. Moreover, the bounding box may include multiple pixels, such that the lane marking detection module 104 may determine a second pixel from a plurality of pixels other than the first pixel. In that instance, the lane marking detection module 104 may determine the second pixel based on, for example, the distance of each other pixel within the bounding box from the first pixel. The lane marking detection module 104 may automatically determine that the other pixel that is the shortest distance from the first pixel is the second pixel. However, it is to be appreciated that the lane marking detection module 104 may determine the second pixel in any suitable manner.

After determining the second pixel, the lane marking detection module 104 may link the first pixel and the second pixel. To ensure that each pixel included in the set of pixels is linked to at least one other pixel, the lane marking detection module 104 may iteratively perform the linking algorithm until each pixel in the set of pixels is linked to another pixel in the set of pixels. In embodiments, the lane marking detection module 104 may only link each pixel in the set of pixels to at most two other pixels in the set of pixels.

Moreover, in embodiments, the lane marking detection module 104 may execute a partitioning algorithm to partition the linked sections of pixels. The partitioning algorithm may include constructing a line between a start pixel of the set of pixels and an end pixel of the set of pixels (e.g., as illustrated in FIG. 6E). The lane marking detection module 104 may then determine a distance of each pixel between the start pixel and end pixel from the line. Based on the distance corresponding to each pixel, the lane marking detection module 104 may partition each pixel between the start pixel and end pixel into one group of the plurality of groups. Further, the lane marking detection module 104 iteratively perform the partitioning algorithm until each pixel of the set of pixels is included in one group of the plurality of groups.

At block 806, the lane marking detection module 104 or other suitable processor may generate a spline that traverses the control points of the plurality of groups. Generally speaking, the spline describes a boundary of a lane. The spline may be a line or any higher order curve, and may be generated by any suitable spline technique. For example, the lane marking detection module 104 may execute a spline technique utilizing only the one or more control points. In embodiments, the spline technique may be a Catmull-Rom spline technique. In this manner, the lane marking detection module 104 greatly reduces the computational resources required to identify lane markings by reducing the number of points used in the splining process compared to conventional techniques.

However, in embodiments, the computing system (e.g., lane marking detection module 104) may link received pixels together in a manner similar to that illustrated in FIG. 6C. Accordingly, the computing system may implement a method 900 according to a flow diagram illustrated in FIG. 9. The method 900 begins by receiving an image of a road surface, where the image is made up of multiple pixels (block 902). Block 902 may be performed by, for example, the lane marking detection module 104 of FIG. 1, or any suitable processor.

The image may contain pixels corresponding to multiple sets of lane markings (e.g., defining multiple pairs of lanes), such that the lane marking detection module 104 should generate multiple groups of pixels. Thus, at block 904, the lane marking detection module 104 may begin determining the multiple groups of pixels by identifying lane marking pixels that correspond to lane markings. The lane marking detection module 104 may identify lane marking pixels through any suitable method, but in embodiments, may apply a machine learning model to the image. The machine learning model may be configured to predict which pixels in the image will be associated with the first group of pixels or the second group of pixels. Additionally or alternatively, the lane marking detection module 104 may apply indications from an operator regarding the pixels in the image corresponding to lane markings.

Once the lane marking pixels are identified, the lane marking detection module 104 may estimate a left boundary and a right boundary relative to the lane marking pixels (block 906). The left and the right boundaries may be substantially aligned with a direction of a lane indicated by the lane marking pixels. For example, the lane marking detection module 104 may estimate the left and the right boundaries for each group by generating respective predictions using the machine learning model mentioned above. Further in this example, the lane marking detection module 104 may configure the machine learning model to generate the predictions related to the left and the right boundaries simultaneously with predictions related to road segmentation. Thus, the lane marking detection module 104 may more efficiently determine lane markings by performing the road segmentation and lane boundary prediction functions in parallel. Thus, the lane marking detection module 104 may more efficiently determine lane markings by performing the road segmentation and lane boundary prediction functions in parallel.

Generally speaking, segmentation refers to partitioning an image into multiple segments, each of which likely depicts a same object or a portion of an image. More specifically, road segmentation refers to determining which sets of nearby pixels likely represent portions of a roadway (e.g., highway, bridge, etc.). Thus, the lane marking detection module 104 for example can perform segmentation to separate a pixel that likely depicts the surface of a highway from a nearby pixel that likely depicts a car tire, so that these pixels belong to different segments for the purposes of subsequent image processing At block 908, the lane marking detection module 104 may associate pixels within the left boundary and the right boundary with the corresponding group. For example, the lane marking detection module 104 may associate the pixels with either a first group of pixels associated with lane markings separating a first pair of lanes or a second group of pixels associated with lane markings separating a second pair of lanes. In embodiments, the lane marking detection module 104 may apply a region growth algorithm to grow clusters initially containing only the lane marking pixels. Moreover, the lane marking detection module 104 may restrict the region growth algorithm to prevent pixels in the first group from crossing either boundary of the second group.

As another example, assume the image of the road surface includes a plurality of rows substantially perpendicular to the orientation of the lanes. For a lane marking pixel in a certain row, the lane marking detection module 104 may estimate to which next-row pixel in an adjacent row the pixel is connected. Generally, the next-row pixel may be (i) immediately below the lane marking pixel, (ii) immediately below and one pixel to the left of the marking pixel, or (iii) immediately below and one pixel to the right of the marking pixel; but may be any suitable displacement from the marking pixel. The lane marking detection module 104 may then grow clusters of pixels associated with the first group or the second group along connected pixels.

Additionally or alternatively, the lane marking detection module 104 may apply a machine-learning model trained using (i) a prior plurality of pixels and (ii) one or more indications that a first adjacent-row pixel and a second adjacent-row pixel in the prior plurality of pixels are connected when the first adjacent-row pixel is (a) immediately below the second adjacent-row pixel, (b) immediately below and one pixel to the left of the second adjacent-row pixel, or (c) immediately below and one pixel to the right of the second adjacent-row pixel.

In any event, the computing systems of the present disclosure may utilize the spline generation techniques described above to predict and/or track the location of lane markings. Predicting and/or tracking the location of lane markings may involve the computing systems implementing a method 1000 according to a flow diagram illustrated in FIG. 10. The method 1000 begins by receiving a set of pixels associated with lane markings (block 1002). For example, the computing systems (e.g., lane marking detection module 104) may receive the set of pixels in accordance with the methods described above. Similarly in accordance with the methods described above, the lane marking detection module 104 may generate a spline describing the boundary of a lane based on the set of pixels (block 1004).

At block 1006, the computing systems (e.g., lane tracking and prediction module 105) may generate a predicted extension of the spline in a direction in which the imaging system is moving. The predicted extension of the spline may be based on a curvature of at least a portion of the spline. Additionally, the predicted extension of the spline may be further based on map data that includes information about the shape, direction, or curvature of a road. For example, map data may indicate that the road ahead curves to the right, and accordingly, a rightward curvature may be applied to the predicted extension of the spline. In embodiments, the set of pixels may be a first set of pixels generated at a first time for a first portion of the road. In these embodiments, the lane marking detection module 104 may receive a second set of pixels associated with lane markings from, for example, the one or more sensors 101. The lane marking detection module 104 may then generate an updated spline describing the boundary of the lane, and compare the predicted extension of the spline to the updated spline to determine a likelihood score.

As described above, the lane marking detection module 104 may determine the likelihood score by convolving respective values of (i) a Gaussian kernel derived from the updated spline and (ii) a histogram representing the second set of pixels. Moreover, the updated spline may include multiple updated splines, such that the convolution generates a set of convolved values. The lane marking detection module 104 may then determine the likelihood score by summing over the set of convolved values.

In embodiments, the lane tracking and prediction module 105 may generate a plurality of predicted extensions of the spline in the direction in which the imaging system is moving. The lane tracking and prediction module 105 may generate the plurality of predicted extensions based on the curvature of at least the portion of the spline. Further in these embodiments, the lane tracking and prediction module 105 may generate the plurality of predicted extensions using a machine learning model, and compare each of the plurality of predicted extensions of the spline to the updated spline to determine a plurality of likelihood scores. The lane tracking and prediction module 105 may then adjust the machine learning model by analyzing the plurality of likelihood scores.

In embodiments, the lane tracking and prediction module 105 may generate the predicted extension of the spline by applying a particle-filter technique. Broadly, the lane tracking and prediction module 105 may predict the location of the pixels associated with lane markings that are located beyond the range of the vehicle sensors and estimate the geometry of the predicted extension of the spline based on prior observations of lane marking locations in comparison to the associated prior predicted extensions of the splines. A particle-filter technique may include generating multiple predicted splines, where each predicted spline includes (i) a first spline and (ii) a predicted extension of the first spline. Each first spline may be generated based on a set of received pixels associated with lane markings, and each predicted extension of a first spline may be based at least in part on the curvature of at least a portion of the first spline. Each predicted spline may be referred to as a particle, and a likelihood score may be determined for each of the predicted splines. The multiple predicted splines may be combined together based on their associated likelihood scores, and the combined spline may correspond to a predicted lane boundary. For example, the multiple predicted splines may be combined together based on an expected value or weighted average, where each predicted spline is weighted according to its likelihood score. At least some of the particles from a previous iteration may be used in a subsequent iteration (along with a subsequent set of point cloud data) to predict a subsequent combined spline, corresponding to a subsequent lane-boundary prediction.

In embodiments, the lane tracking and prediction module 105 may apply a noise signal to a predicted extension of a spline. Multiple predicted splines may be generated, where each predicted spline includes (i) a first spline and (ii) a predicted extension of the first spline. A perturbation, in the form of a noise signal, may be added to each of the first splines and/or to each of the predicted extensions. The noise signal may be applied to each of the predicted extensions and may include a change in the amount of curvature of the predicted extensions. For example, an increase in curvature may be applied to some of the predicted extensions, and a decrease in curvature may be applied to other predicted extensions. The noise signal, which adds or removes curvature from the predicted extensions, may account for the changing curvature of a lane ahead, where the change in curvature is not known at the moment. As another example, if map data is available that indicates a shape, direction, or curvature of the road ahead, then the noise signal may be biased or shifted based on the map data. For example, if map data indicates that the road ahead curves to the left, then the noise signal may be configured to apply curvatures with a left-directed bias to the predicted extensions.

What is claimed is:

1. A method for tracking a lane on a road, the method comprising:
    receiving, by one or more processors from an imaging system, a set of pixels associated with lane markings; and
    generating, by the one or more processors, a predicted spline comprising (i) a first spline and (ii) a predicted extension of the first spline in a direction in which the imaging system is moving, wherein:
        the first spline describes a boundary of the lane and is generated based on the set of pixels; and
        the predicted extension of the first spline is generated based at least in part on a curvature of at least a portion of the first spline.

2. The method of claim 1, wherein generating the predicted extension of the first spline is further based on map data comprising a shape, a direction, or a curvature of the road.

3. The method of claim 1, wherein the set of pixels is a first set of pixels generated at a first time for a first portion of the road, the method further comprising:

receiving, by the one or more processors from the imaging system, a second set of pixels associated with lane markings;

generating, by the one or more processors, an updated spline describing the boundary of the lane; and comparing the predicted spline to the second set of pixels to determine a likelihood score.

4. The method of claim 3, wherein comparing the predicted spline to the second set of pixels to determine the likelihood score comprises:

convolving respective values of (i) a Gaussian kernel derived from the predicted spline and (ii) a histogram representing the second set of pixels, wherein the convolving generates a set of convolved values; and summing over the set of convolved values to determine the likelihood score.

5. The method of claim 4, wherein each Gaussian kernel is normalized to an area.

6. The method of claim 3, wherein the likelihood score is further based on a measure of drivability associated with the predicted spline, the measure of drivability being based on a curvature of at least a portion of the predicted spline.

7. The method of claim 3, further comprising:

training a machine learning model to generate predicted extensions of splines using (i) a prior set of pixels associated with lane markings, (ii) a prior set of first splines based on the prior set of pixels, and (iii) a prior set of updated splines; and applying the machine learning model to the set of pixels to generate the predicted extension of the first spline.

8. The method of claim 7, wherein applying the machine learning model includes applying, as feature labels, indications from an operator regarding pixels in an image corresponding to the lane markings.

9. The method of claim 1, wherein generating the predicted spline includes generating a plurality of predicted splines, each predicted spline including a first spline and a predicted extension of the first spline in the direction in which the imaging system is moving, based at least in part on the curvature of at least the portion of the first spline.

10. The method of claim 9, wherein the predicted extension of the first spline is generated using a machine learning model, comparing the predicted spline to a second set of pixels includes comparing each of the plurality of predicted splines to the second set of pixels to determine a plurality of likelihood scores, and the method further comprises:

adjusting the machine learning model based on an analysis of the plurality of likelihood scores.

11. The method of claim 1, wherein generating the predicted spline includes applying a particle-filter technique comprising:

generating a plurality of particles, each particle comprising a predicted spline that includes (i) a first spline and (ii) a predicted extension of the first spline, wherein the predicted extension of the first spline is based at least in part on the curvature of at least the portion of the first spline; and determining a likelihood score for each of the plurality of predicted splines.

12. The method of claim 11, wherein the particle-filter technique further comprises:

determining a location of the boundary of the lane by combining the plurality of particles according to associated likelihood scores.

13. The method of claim 12, wherein combining the plurality of particles comprises:

determining a weighted average of the plurality of predicted splines to determine the location of the boundary of the lane, wherein each predicted spline is weighted according to its associated likelihood score.

14. The method of claim 1, wherein generating the predicted spline includes:

generating a plurality of predicted splines, each predicted spline including (i) a first spline and (ii) a predicted extension of the first spline based at least in part on the curvature of at least the portion of the first spline; and applying a perturbation to each of the predicted extensions by adding a particular noise signal to each predicted extension.

15. The method of claim 14, wherein adding the particular noise signal comprises increasing an amount of curvature of the predicted extension for a first portion of the predicted splines and decreasing the amount of curvature of the predicted extension for a second portion of the predicted splines.

16. The method of claim 14, wherein adding the particular noise signal comprises increasing or decreasing an amount of curvature of the predicted extension for a first portion of the predicted splines based on map data comprising a shape, a direction, or a curvature of the road.

17. The method of claim 14, wherein the plurality of predicted splines includes at least fifty predicted splines.

18. The method of claim 1, further comprising:

partitioning, by the one or more processors, the set of pixels into a plurality of groups, each of the plurality of groups associated with one or more control points; and generating, by the one or more processors, a spline that traverses the control points of the plurality of groups, the spline describing a boundary of a lane.

19. The method of claim 18, wherein generating the spline further comprises executing, by the one or more processors, a spline technique, and wherein the spline technique utilizes only the one or more control points.

20. The method of claim 19, wherein the spline technique is a Catmull-Rom spline technique.

* * * * *